(12) United States Patent
Wang

(10) Patent No.: US 11,244,196 B2
(45) Date of Patent: Feb. 8, 2022

(54) METHOD OF SEMANTICALLY SEGMENTING INPUT IMAGE, APPARATUS FOR SEMANTICALLY SEGMENTING INPUT IMAGE, METHOD OF PRE-TRAINING APPARATUS FOR SEMANTICALLY SEGMENTING INPUT IMAGE, TRAINING APPARATUS FOR PRE-TRAINING APPARATUS FOR SEMANTICALLY SEGMENTING INPUT IMAGE, AND COMPUTER-PROGRAM PRODUCT

(71) Applicant: BOE Technology Group Co., Ltd., Beijing (CN)

(72) Inventor: Tingting Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 68 days.

(21) Appl. No.: 16/960,071

(22) PCT Filed: Oct. 10, 2019

(86) PCT No.: PCT/CN2019/110452
§ 371 (c)(1),
(2) Date: Jul. 3, 2020

(87) PCT Pub. No.: WO2020/244108
PCT Pub. Date: Dec. 10, 2020

(65) Prior Publication Data
US 2021/0406582 A1 Dec. 30, 2021

(30) Foreign Application Priority Data
Jun. 5, 2019 (CN) .......................... 201910489560.0

(51) Int. Cl.
*G06K 9/46* (2006.01)
*G06T 7/10* (2017.01)
*G06K 9/62* (2006.01)

(52) U.S. Cl.
CPC ......... *G06K 9/4671* (2013.01); *G06K 9/6256* (2013.01); *G06T 7/10* (2017.01);
(Continued)

(58) Field of Classification Search
CPC .. G06K 9/62; G06K 9/00; G06K 9/46; G06K 9/52; G06K 9/50; G06K 9/72; G06K 9/20;
(Continued)

(56) References Cited

U.S. PATENT DOCUMENTS

| 2020/0175320 A1* | 6/2020 | Panging | G06K 9/6251 |
| 2020/0175673 A1* | 6/2020 | Wen | B65B 25/001 |
| 2021/0334578 A1* | 10/2021 | Lim | G06N 3/04 |

FOREIGN PATENT DOCUMENTS

| CN | 103996185 A | 8/2014 |
| CN | 107403430 A | 11/2017 |

(Continued)

OTHER PUBLICATIONS

International Search Report & Written Opinion dated Mar. 9, 2020, regarding PCT/CN2019/110452.
(Continued)

*Primary Examiner* — Quan M Hua
(74) *Attorney, Agent, or Firm* — Intellectual Valley Law, P.C.

(57) ABSTRACT

A method of semantically segmenting an input image using a neural network is provided. The method includes extracting features of the input image to generate one or more feature maps; and analyzing the one or more feature maps to generate a plurality of predictions respectively correspond-
(Continued)

ing to a plurality of subpixels of the input image. Extracting features of the input image is performed using a residual network having N number of residual blocks, N being a positive integer greater than 1. Analyzing the one or more feature maps is performed through M number of feature analyzing branches to generate M sets of predictions. A respective one set of the M sets of predictions includes multiple predictions respectively corresponding to the plurality of subpixels of the input image. A respective one of the plurality of predictions is an average value of corresponding ones of the M sets of predictions.

20 Claims, 11 Drawing Sheets

(52) U.S. Cl.
CPC ............... *G06T 2207/20081* (2013.01); *G06T 2207/20084* (2013.01)

(58) Field of Classification Search
CPC ............ G06K 9/36; G06N 3/08; G06N 20/00; G06N 3/02; G06N 3/063; G06N 7/00; G06N 20/10; G06N 7/08; G06N 5/00; G06T 7/00; G06T 7/11; G06T 3/40; G06T 7/73; G06T 7/246; G06T 7/194; G06T 7/70; G06T 7/13; G06T 5/00; G06T 11/60; G06T 7/44; G06T 7/60; G06T 11/00; G06T 13/40; G06T 7/20; G06T 7/593; G06T 1/00; G06T 15/08; G06T 17/00; G06T 7/10; G06T 7/50; G06T 1/20; G06T 15/20; G06T 17/05; G06T 19/00

See application file for complete search history.

(56) References Cited

FOREIGN PATENT DOCUMENTS

| | | |
|---|---|---|
| CN | 108875807 A | 11/2018 |
| CN | 109461157 A | 3/2019 |
| CN | 109784386 A | 5/2019 |
| EP | 3432263 A1 | 1/2019 |

OTHER PUBLICATIONS

First Office Action in the Chinese Patent Application No. 201910489560.0, dated Oct. 23, 2020; English translation attached.

Zheng et al., "Conditional Random Fields as Recurrent Neural Networks", IEEE ICCV 2015, arXv:1502.03240 [cs CV].

Fu et al., "Dual Attention Network for Scene Segmentation", CVPR2019, arXiv:1809.02983v4 [cs.CV], Apr. 21, 2019.

Peng et al., "Large Kernel Matters—Improve Semantic Segmentation by Global Convolutional Network", arXiv:1703.02719 [cs.CV], Mar. 8, 2017.

Li et al., "Pyramid Attention Network for Semantic Segmentation", arXiv:1805.10180 [cs.CV], May 25, 2018.

* cited by examiner

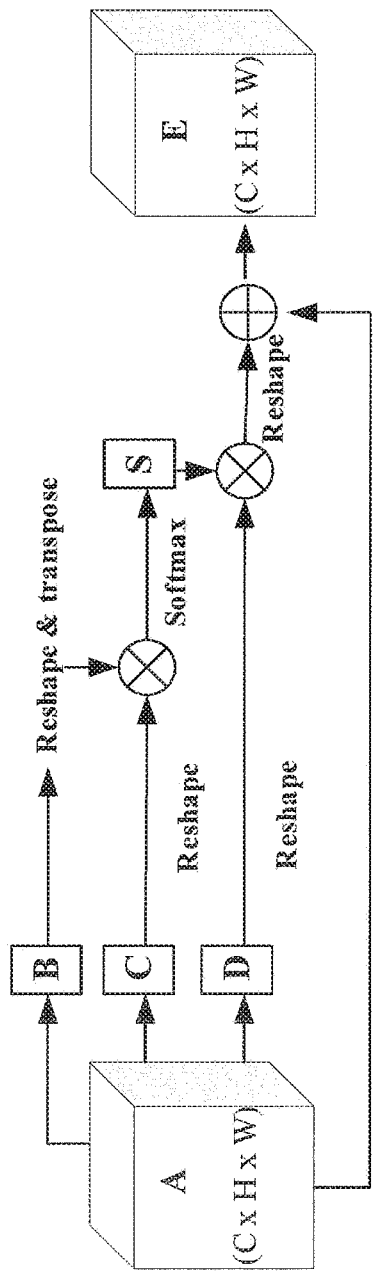
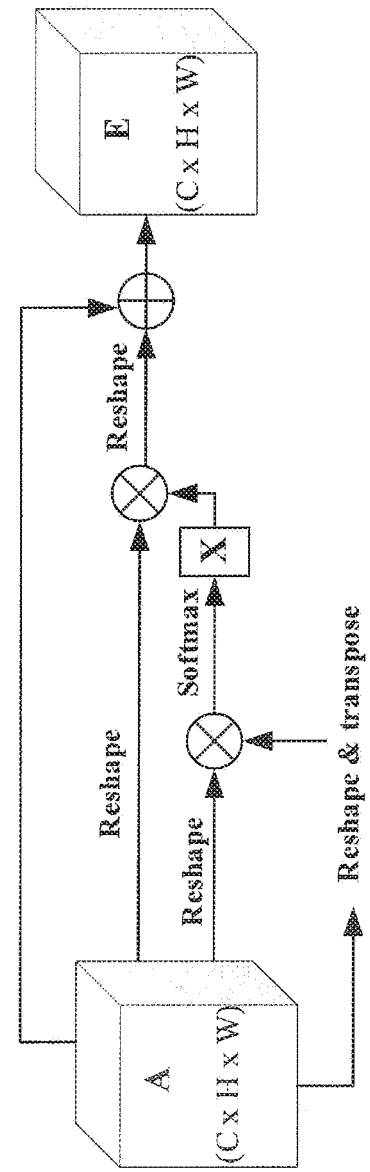
FIG. 8
FIG. 9

METHOD OF SEMANTICALLY SEGMENTING INPUT IMAGE, APPARATUS FOR SEMANTICALLY SEGMENTING INPUT IMAGE, METHOD OF PRE-TRAINING APPARATUS FOR SEMANTICALLY SEGMENTING INPUT IMAGE, TRAINING APPARATUS FOR PRE-TRAINING APPARATUS FOR SEMANTICALLY SEGMENTING INPUT IMAGE, AND COMPUTER-PROGRAM PRODUCT

CROSS-REFERENCE TO RELATED APPLICATION

This application is a national stage application under 35 U.S.C. § 371 of International Application No. PCT/CN2019/110452, filed Oct. 10, 2019, which claims priority to Chinese Patent Application No. 201910489560.0, filed Jun. 5, 2019. Each of the forgoing applications is herein incorporated by reference in its entirety for all purposes.

TECHNICAL FIELD

The present invention relates to display technology, more particularly, to a method of semantically segmenting an input image using a neural network; an apparatus for semantically segmenting an input image using a neural network; a method of pre-training an apparatus for semantically segmenting an input image using a neural network; a training apparatus for pre-training an apparatus for semantically segmenting an input image using a neural network, and a computer-program product.

BACKGROUND

Image sematic segmentation is a basic technology of image understanding. The image sematic segmentation is an important function in products such as products having autopilot systems, drones, and wearable devices.

An image is composed of a number of pixels, the image sematic segmentation is a process of grouping or segmenting pixels based on the sematic meanings expressed by the pixels.

SUMMARY

In one aspect, the present invention provides a method of semantically segmenting an input image using a neural network, comprising extracting features of the input image to generate one or more feature maps; and analyzing the one or more feature maps to generate a plurality of predictions respectively corresponding to a plurality of subpixels of the input image; wherein extracting features of the input image comprises extracting features of the input image using a residual network having N number of residual blocks, N being a positive integer greater than 1; wherein analyzing the one or more feature maps comprises analyzing the one or more feature maps through M number of feature analyzing branches to generate M sets of predictions; a respective one set of the M sets of predictions comprises multiple predictions respectively corresponding to the plurality of subpixels of the input image; and a respective one of the plurality of predictions is an average value of corresponding ones of the M sets of predictions.

Optionally, the M number of feature analyzing branches comprise a first feature analyzing branch comprising a dual attention network and a first conditional random field sequentially connected; and a second feature analyzing branch comprising a pyramid pooling module and a second conditional random field sequentially connected; wherein the one or more feature maps comprise a first feature map generated from an N-th residual block of the N number of residual blocks; wherein analyzing the one or more feature maps comprises analyzing the first feature map using the first feature analyzing branch, to generate a plurality of first predictions respectively corresponding to the plurality of subpixels of the input image; and analyzing the first feature map using the second feature analyzing branch, to generate a plurality of second predictions respectively corresponding to the plurality of subpixels of the input image.

Optionally, analyzing the first feature map using the first feature analyzing branch comprises inputting the first feature map to the dual attention network, to generate a dual attention feature map; performing a deconvolution process on the dual attention feature map, to generate a deconvolutional dual attention feature map; and inputting the deconvolutional dual attention feature map into the first conditional random field, to generate the plurality of first predictions respectively corresponding to the plurality of subpixels of the input image.

Optionally, the first feature map is input into both the dual attention network and the pyramid pooling module; wherein analyzing the first feature map using the second feature analyzing branch comprises inputting the first feature map to the pyramid pooling module, to generate a pyramid pooling feature map; performing a deconvolution process on the pyramid pooling feature map, to generate a deconvolutional pyramid pooling feature map; and inputting deconvolutional pyramid pooling feature map into the second conditional random field, to generate the plurality of second predictions respectively corresponding to the plurality of subpixels of the input image.

Optionally, the M number of feature analyzing branches further comprise a third feature analyzing branch, and the third feature analyzing branch comprises a third conditional random field; wherein the one or more feature maps further comprise a second feature map generated from an (N−1)-th residual block of the N number of residual blocks; wherein analyzing the one or more feature maps further comprises analyzing the second feature map using the third feature analyzing branch, to generate a plurality of third predictions respectively corresponding to the plurality of subpixels of the input image.

Optionally, analyzing the second feature map using the third feature analyzing branch comprises performing a plurality of convolution processes on the second feature map, to generate a convolutional second feature map; performing a deconvolution process on the convolutional second feature map, to generate a deconvolutional second feature map; and inputting the deconvolutional second feature map into the third conditional random field, to generate a plurality of third predictions respectively corresponding to the plurality of subpixels of the input image.

Optionally, the respective one of the plurality of predictions is an average value of the respective one of the plurality of first predictions, the respective one of the plurality of second predictions, and a respective one of the plurality of third predictions.

Optionally, the second feature map is input into the third feature analyzing branch, and is input into the N-th residual block of the N number of residual blocks for generating the first feature map.

Optionally, the residual network is a dilated residual network.

In another aspect, the present invention provides an apparatus for semantically segmenting an input image using a neural network, comprising a memory; one or more processors; wherein the memory and the one or more processors are connected with each other; and the memory stores computer-executable instructions for controlling the one or more processors to extract features of the input image to generate one or more feature maps; and analyze the one or more feature maps to generate a plurality of predictions respectively corresponding to a plurality of subpixels of the input image; wherein controlling the one or more processors to extract features of the input image comprises controlling the one or more processors to extract features of the input image using a residual network having N number of residual blocks, N being a positive integer greater than 1; wherein controlling the one or more processors to analyze the one or more feature maps comprises controlling the one or more processors to analyze the one or more feature maps through M number of feature analyzing branches to generate M sets of predictions; a respective one set of the M sets of predictions comprises multiple predictions respectively corresponding to the plurality of subpixels of the input image; and a respective one of the plurality of predictions is an average value of corresponding ones of the M sets of predictions.

Optionally, the M number of feature analyzing branches comprise a first feature analyzing branch comprising a dual attention network and a first conditional random field sequentially connected; and a second feature analyzing branch comprising a pyramid pooling module and a second conditional random field sequentially connected; wherein the one or more feature maps comprise a first feature map generated from an N-th residual block of the N number of residual blocks; wherein controlling the one or more processors to analyze the one or more feature maps comprises controlling the one or more processors to analyze the first feature map using the first feature analyzing branch, to generate a plurality of first predictions respectively corresponding to the plurality of subpixels of the input image; and controlling the one or more processors to analyze the first feature map using the second feature analyzing branch, to generate a plurality of second predictions respectively corresponding to the plurality of subpixels of the input image.

Optionally, controlling the one or more processors to analyze the first feature map using the first feature analyzing branch comprises controlling the one or more processors to input the first feature map to the dual attention network, to generate a dual attention feature map; controlling the one or more processors to perform a deconvolution process on the dual attention feature map, to generate a deconvolutional dual attention feature map; and controlling the one or more processors to input the deconvolutional dual attention feature map into the first conditional random field, to generate the plurality of first predictions respectively corresponding to the plurality of subpixels of the input image.

Optionally, the first feature map is input into both the dual attention network and the pyramid pooling module; wherein controlling the one or more processors to analyze the first feature map using the second feature analyzing branch comprises controlling the one or more processors to input the first feature map to the pyramid pooling module, to generate a pyramid pooling feature map; controlling the one or more processors to perform a deconvolution process on the pyramid pooling feature map, to generate a deconvolutional pyramid pooling feature map; and controlling the one or more processors to input deconvolutional pyramid pooling feature map into the second conditional random field, to generate the plurality of second predictions respectively corresponding to the plurality of subpixels of the input image.

Optionally, the M number of feature analyzing branches further comprise a third feature analyzing branch, and the third feature analyzing branch comprises a third conditional random field; wherein the one or more feature maps further comprise a second feature map generated from an (N−1)-th residual block of the N number of residual blocks; wherein controlling the one or more processors to analyze the one or more feature maps further comprises controlling the one or more processors to analyze the second feature map using the third feature analyzing branch, to generate a plurality of third predictions respectively corresponding to the plurality of subpixels of the input image.

Optionally, controlling the one or more processors to analyze the second feature map using the third feature analyzing branch comprises controlling the one or more processors to performing a plurality of convolution processes on the second feature map, to generate a convolutional second feature map; controlling the one or more processors to perform a deconvolution process on the convolutional second feature map, to generate a deconvolutional second feature map; and controlling the one or more processors to input the deconvolutional second feature map into the third conditional random field, to generate a plurality of third predictions respectively corresponding to the plurality of subpixels of the input image.

Optionally, the respective one of the plurality of predictions is an average value of the respective one of the plurality of first predictions, the respective one of the plurality of second predictions, and a respective one of the plurality of third predictions.

Optionally, the second feature map is input into the third feature analyzing branch, and is input into the N-th residual block of the N number of residual blocks for generating the first feature map.

Optionally, the residual network is a dilated residual network.

In another aspect, the present invention provides a method of pre-training an apparatus for semantically segmenting an input image using a neural network, comprising obtaining a training database having a plurality of training images, a respective one of the plurality of training images having a plurality of pre-determined predictions respectively corresponding to a plurality of subpixels of the respective one of the plurality of training images; selecting a training image from the training database; extracting features of the training image to generate one or more training feature maps; analyzing the one or more training feature maps to generate a plurality of training predictions respectively corresponding to a plurality of subpixels of the training image; computing total losses with respect to the plurality of subpixels of the training image using a loss function based on the plurality of training predictions and the plurality of pre-determined predictions, and tuning parameters of the apparatus based on the total losses; wherein extracting features of the training image comprises extracting features of the training image using a residual network having N number of residual blocks, N being a positive integer greater than 1; wherein analyzing the one or more training feature maps comprises analyzing the one or more training feature maps through M number of feature analyzing branches respectively, to generate M sets of training predictions; a respective one set of the M sets of training predictions comprises multiple training predictions respectively corresponding to the plurality of subpixels of the training image; and a respective one of the plurality of training predictions is an average value of corresponding ones of the M sets of training predictions; wherein computing the total losses with respect to the plurality of subpixels of the training image comprises computing M sets of losses; a respective one set of the M sets of losses comprises multiple losses respectively corresponding to the plurality of subpixels of the training image; wherein the total losses with respect to the plurality of subpixels of the training image is a weighted average of corresponding ones of the M sets of losses.

Optionally, the M number of feature analyzing branches comprise a first feature analyzing branch comprising a dual attention network and a first conditional random field sequentially connected; and a second feature analyzing branch comprising a pyramid pooling module and a second conditional random field sequentially connected; wherein the one or more training feature maps comprise a first training feature map generated from an N-th residual block of the N number of residual blocks; wherein analyzing the one or more training feature maps comprises analyzing the first training feature map using the first feature analyzing branch, to generate a plurality of first training predictions respectively corresponding to the plurality of subpixels of the training image; and analyzing the first training feature map using the second feature analyzing branch, to generate a plurality of second training predictions respectively corresponding to the plurality of subpixels of the input image; wherein computing the total losses with respect to the plurality of subpixels of the training image comprises computing first losses respectively corresponding to the plurality of subpixels of the training image and between the plurality of first training predictions and the plurality of pre-determined predictions using a softmax cross-entropy loss function; and computing second losses respectively corresponding to the plurality of subpixels of the training image and between the plurality of second training predictions and the plurality of pre-determined predictions using the softmax cross-entry loss function.

Optionally, analyzing the first training feature map using the first feature analyzing branch comprises inputting the first training feature map to the dual attention network, to generate a training dual attention feature map; performing a deconvolution process on the training dual attention feature map, to generate a training deconvolutional dual attention feature map; and inputting the training deconvolutional dual attention feature map into the first conditional random field, to generate the plurality of first training predictions respectively corresponding to the plurality of subpixels of the input image.

Optionally, the first training feature map is input into both the dual attention network and the pyramid pooling module; wherein analyzing the first training feature map using the second feature analyzing branch comprises inputting the first training feature map to the pyramid pooling module, to generate a training pyramid pooling feature map; performing a deconvolution process on the training pyramid pooling feature map, to generate a training deconvolutional pyramid pooling feature map; and inputting training deconvolutional pyramid pooling feature map into the second conditional random field, to generate the plurality of second training predictions respectively corresponding to the plurality of subpixels of the input image.

Optionally, the M number of feature analyzing branches further comprise a third feature analyzing branch, and the third feature analyzing branch comprises a third conditional random field; wherein the one or more training feature maps further comprises a second training feature map generated from (N−1)-th residual block of the N number of residual blocks; wherein analyzing the one or more training feature maps further comprises analyzing the second training feature map using the third feature analyzing branch, to generate a plurality of third training predictions respectively corresponding to the plurality of subpixels of the input image.

Optionally, analyzing the second training feature map using the third feature analyzing branch comprises performing a plurality of convolution processes on the second training feature map, to generate a convolutional second training feature map; performing a deconvolution process on the convolutional second training feature map, to generate a training deconvolutional second feature map; and inputting the training deconvolutional second feature map into the third conditional random field, to generate a plurality of third training predictions respectively corresponding to the plurality of subpixels of the input image; wherein computing the total losses with respect to the plurality of subpixels of the training image further comprises computing third losses with respect to the plurality of subpixels of the training image and between the plurality of third training predictions and the plurality of pre-determined predictions using the softmax cross-entropy loss function.

Optionally, the total losses respectively corresponding to the plurality of subpixels of the training image is a weighted average of the first losses, the second losses, and the third losses respectively corresponding to the plurality of subpixels of the training image.

Optionally, the residual network is a dilated residual network.

In another aspect, the present invention provides a computer-program product comprising a non-transitory tangible computer-readable medium having computer-readable instructions thereon, the computer-readable instructions being executable by a processor to cause the processor to perform extracting features of an input image to generate one or more feature maps; and analyzing the one or more feature maps to generate a plurality of predictions respectively corresponding to a plurality of subpixels of the input image; wherein extracting features of the input image comprises extracting features of the input image using a residual network having N number of residual blocks, N being a positive integer greater than 1; wherein analyzing the one or more feature maps comprises analyzing the one or more feature maps through M number of feature analyzing branches to generate M sets of predictions; a respective one set of the M sets of predictions comprises multiple predictions respectively corresponding to the plurality of subpixels of the input image; and a respective one of the plurality of predictions is an average value of corresponding ones of the M sets of predictions.

BRIEF DESCRIPTION OF THE FIGURES

The following drawings are merely examples for illustrative purposes according to various disclosed embodiments and are not intended to limit the scope of the present invention.

FIG. 8 is a schematic diagram of a structure of a position attention module in some embodiments according to the present disclosure.

FIG. 9 is a schematic diagram of a structure of a channel attention module in some embodiments according to the present disclosure.

DETAILED DESCRIPTION

Figure 1:
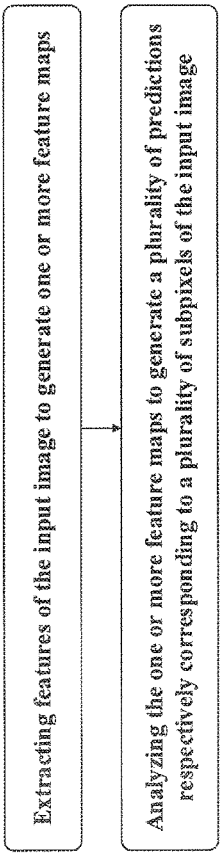
FIG. 1 is a flow chart illustrating a method of semantically segmenting an input image using a neural network in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Applications of deep leaning in the fields of computer visions, and fields of image and video analysis have achieved greater successes. Semantically segmenting an image using deep learning can be understood as classifying each pixel in the image, so that objects in the image are classified and the positions of objects are located. However, semantically segmenting an image using deep learning still has shortcomings such as mismatching, fuzzy classification, and ignoring small objects.

Accordingly, the present disclosure provides, inter alia, a touch substrate, a method of semantically segmenting an input image using a neural network; an apparatus for semantically segmenting an input image using a neural network; a method of pre-training an apparatus for semantically segmenting an input image using a neural network; a training apparatus for pre-training an apparatus for semantically segmenting an input image using a neural network, and a computer-program product that substantially obviate one or more of the problems due to limitations and disadvantages of the related art. In one aspect, the present disclosure provides a method of semantically segmenting an input image using a neural network. In some embodiments, the method of semantically segmenting the input image includes extracting features of the input image to generate one or more feature maps; and analyzing the one or more feature maps to generate a plurality of predictions respectively corresponding to a plurality of subpixels of the input image. Optionally, extracting features of the input image includes extracting features of the input image using a residual network having N number of residual blocks, N being a positive integer greater than 1. Optionally, analyzing the one or more feature maps includes analyzing the one or more feature maps through M number of feature analyzing branches to generate M sets of predictions. Optionally, a respective one set of the M sets of predictions includes multiple predictions respectively corresponding to the plurality of subpixels of the input image. Optionally, a respective one of the plurality of predictions is an average value of corresponding ones of the M sets of predictions.

Semantically segmenting an image generally refers to a process of grouping the pixels in the image according to an expressed semantic meaning, to recognize the contents of the image. In semantic segmentation, a value is assigned to each classified pixel in the image, the classification is performed at a pixel level. For example, in an image having sky, road, grass, person, car, and bicycle, pixels associated with the sky will be labeled sky, and pixels associated with road will be labeled road.

FIG. 1 is a flow chart illustrating a method of semantically segmenting an input image using a neural network in some embodiments according to the present disclosure. In some embodiments, referring to FIG. 1, the method of semantically segmenting an input image using a neural network includes extracting features of the input image to generate one or more feature maps; and analyzing the one or more feature maps to generate a plurality of predictions respectively corresponding to a plurality of subpixels of the input image.

As used herein, the term "feature map" refers to a map or data representing a particular feature or parameter or characteristic of an image. The feature map may be graphically or mathematically represented. The feature map may be a form of simplified or alternative representation of an image. For example, the feature map is an outcome of applying a function to a topologically arranged vector of numbers to obtain a vector of corresponding output numbers preserving a topology. For example, a "feature map" is the result of using a layer of convolutional neural network to process an image or another feature map, for example, an image of scale (28, 28, 1) is input into the convolution layer, and the convolutional layer having 23 number of kernels with a kernel size of 1×1 generates a feature map of scale (26, 26, 32) by computing 32 kernels over the input image. A feature map has a width W, a height H, and a depth D, for example, the feature map of scale (26, 26, 32) has a width of 26, a height of 26, and a depth of 32. The feature map has 32 feature sub-maps, a total number of the feature sub-maps is equivalent to the depth of the feature map. The depth D is also represented by channels of the feature map, so the feature map of scale (26, 26, 32) includes 32 channels and each channels has a 26×26 grid of values.

Figure 2:
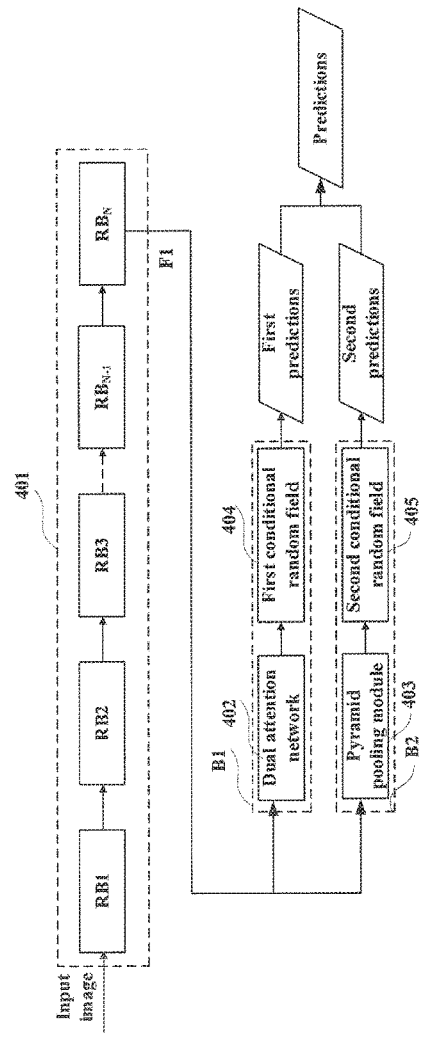
FIG. 2 is a schematic diagram of a structure of a neural network for semantically segmenting an input image in some embodiments according to the present disclosure.

FIG. 2 is a schematic diagram of a structure of a neural network for semantically segmenting an input image in some embodiments according to the present disclosure. Referring to FIG. 1 and FIG. 2, in some embodiments, extracting features of the input image includes extracting features of the input image using a residual network 401 having N number of residual blocks RB, N is a positive integer greater than 1. Optionally, the residual network 401 is a dilated residual network. For example, the residual network is a ResNet 101 having N number of residual blocks, and each of the N number residual blocks has a plurality of convolutional layers configured to perform convolution. At least one residual block of the N number of residual blocks can perform a dilated convolution. The dilated convolution can increase receptive view (e.g., global view) of the residual network 401 without losing information of the input image.

As used herein, the term "convolutional layer" refers to a layer in a convolutional neural network. The convolutional layer is used to perform convolution on an input image (e.g., data, feature maps, signals) to obtain an output image. Optionally, different convolutional kernels are used to performed different convolutions on the same input image. Optionally, different convolutional kernels are used to performed convolutions on different parts of the same input image. Optionally, different convolutional kernels are used to perform convolutions on different input images, for example, multiple images are input in a convolutional layer, a respective convolutional kernel is used to perform a convolution on an image of the multiple images. Optionally, different convolutional kernels are used according to different situations of the input image.

As used herein, the term "convolution" refers to a process of processing an image (e.g., data, feature maps, signals). A convolutional kernel is used for a convolution. For example, each pixel of an input image has a value, a convolutional kernel starts at one pixel of the input image and moves over each pixel in an input image sequentially. At each position of the convolutional kernel, the convolutional kernel overlaps a few pixels on the image based on the size of the convolutional kernel. At a position of the convolutional kernel, a value of one of the few overlapped pixels is multiplied by a respective one value of the convolutional kernel to obtain a multiplied value of one of the few overlapped pixels. Subsequently, all multiplied values of the overlapped pixels are added to obtain a sum corresponding to the position of the convolutional kernel on the input image. By moving the convolutional kernel over each pixel of the input image, all the sums corresponding to all the position of the convolutional kernel are collected and output to form an output image. In one example, a convolution may extract different features of the input image using different convolutional kernels. In another example, a convolution process may add more features to the input image using different convolutional kernels.

As used herein, the term "convolutional kernel" or "kernel" refers to a two-dimensional matrix or three-dimensional matrix used in a convolution process. Optionally, a respective one item of a plurality items in the two-dimensional matrix or the three-dimensional matrix has a certain value.

As used herein, the term "dilated convolution" is a process of processing image with a parameter of a dilation rate. Optionally, the dilation rate defines a spacing between items or values in a kernel (e.g., a matrix). For example, a kernel having a spatial scale of 3×3 and a dilation rate of 2 will have a same field of view as a kernel having a spatial scale of 5×5. In another example, a kernel having a spatial scale of 3×3 and a dilation rate of 3 will have a same field of view as a kernel having a spatial scale of 7×7.

In some embodiments, referring to FIG. 2, in the residual network 401, N=5, the residual network 401 includes five residual blocks RB. The five residual blocks RB respectively performs a dilated convolution on inputs respectively to the five residual blocks RB. The dilated convolution of a residual block can increase the receptive view of the residual block without reducing a scale of the input with respect to the residual block.

In some embodiments, referring to FIG. 1 and FIG. 2, analyzing the one or more feature maps includes analyzing the one or more feature maps through M number of feature analyzing branches B to generate M sets of predictions. Optionally, a respective one set of the M sets of predictions includes multiple predictions respectively corresponding to the plurality of subpixels of the input image. Optionally, a respective one of the plurality of predictions is an average value of corresponding ones of the M sets of predictions.

In some embodiments, referring to FIG. 2, the neural network for semantically segmenting the input image includes the residual network 401 and M number of feature analyzing branches B. Optionally, the M number of feature analyzing branches B include a first feature analyzing branch B1 having a dual attention network 402 and a first conditional random field 404 sequentially connected; and a second feature analyzing branch B2 having a pyramid pooling module 403 and a second conditional random field 405 sequentially connected. Optionally, the one or more feature maps include a first feature map F1 generated from an N-th residual block $RB_N$ of the N number of residual blocks RB.

Optionally, referring to FIG. 1 and FIG. 2, analyzing the one or more feature maps includes analyzing the first feature map F1 using the first feature analyzing branch B1, to generate a plurality of first predictions respectively corresponding to the plurality of subpixels of the input image; and analyzing the first feature map F1 using the second feature analyzing branch B2, to generate a plurality of second predictions respectively corresponding to the plurality of subpixels of the input image. For example, the first feature analyzing branch B1 generates a respective one of the plurality of first predictions corresponding to a respective one of the plurality of subpixels of the input image, and the second feature analyzing branch B2 generate a respective one of the plurality of second predictions corresponding to the respective one of the plurality of subpixels of the input image.

Optionally, the respective one of the plurality of predictions is an average value of the respective one of the plurality of first predictions and the respective one of the plurality of second predictions. So, the respective one of the plurality of predictions corresponding to the respective one of the plurality of subpixels of the input image is based on the respective one of the plurality of first predictions and the respective one of the plurality of second predictions corresponding to the respective one of the plurality of subpixels of the input image.

In some embodiments, referring to FIG. 2, since the first feature map F1 is input into the first feature analyzing branch B1, the first feature map F1 is input into the dual attention network 402.

Figure 3:
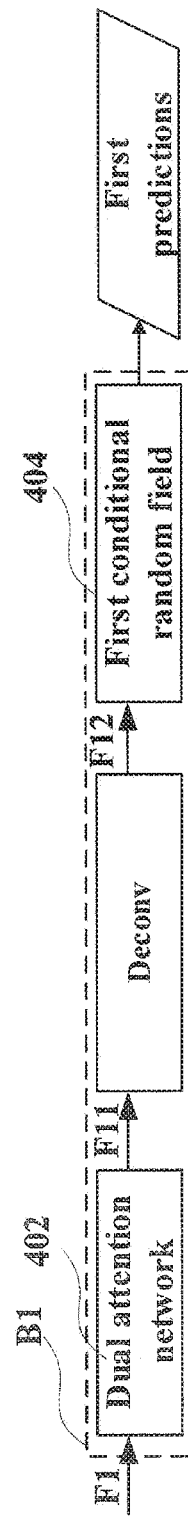
FIG. 3 is a schematic diagram of a structure of a first feature analyzing branch in some embodiments according to the present disclosure.

FIG. 3 is a schematic diagram of a structure of a first feature analyzing branch in some embodiments according to the present disclosure. Optionally, referring to FIG. 2 and FIG. 3, analyzing the first feature map F1 using the first feature analyzing branch B1 includes inputting the first feature map F1 to the dual attention network 402, to generate a dual attention feature map F11; performing a deconvolution process Deconv on the dual attention feature map F11, to generate a deconvolutional dual attention feature map F12; and inputting the deconvolutional dual attention feature map F12 into the first conditional random field 404, to generate the plurality of first predictions respectively corresponding to the plurality of subpixels of the input image.

For example, subsequent to applying the deconvolution process on the dual attention feature map F11, the deconvolutional dual attention feature map F12 obtained from the deconvolution process has a same spatial scale as a spatial scale of the input image, and a same depth (e.g., a total number of channels) as a total number of categories. Subsequent to obtaining the deconvolutional dual attention feature map F12, the first conditional random field 404 are applied to the deconvolutional dual attention feature map F12 to refine weak and coarse pixel-level predictions to produce sharp boundaries and fine-grained segmentations.

As used herein, the term "scale" refers to one or any combinations of three dimensions of an image (e.g., a feature map, a data, a signal), including one or any combinations of a width of the image, a height of the image, and a depth of the image. In one example, the scale of an image (e.g., a feature map, a data, a signal) refers to a "volume" of an image, which includes the width of the image, the height of the image, and the depth of the image. In another example, a spatial scale of an image (e.g., a feature map, a data, a signal) refers to a width and length of the image, e.g., width×length.

As used herein, the term "deconvolution", also known as "transposed convolution", refers to a process of processing an image (e.g., data, signals, feature maps), wherein an output from the deconvolution process has a same scale as an input of a convolution process prior to the deconvolution process. In one example, the deconvolution process includes a padding process and a convolution process, and the padding process is performed prior to the convolution process.

In some embodiments, referring to FIG. 2, the first feature map F1 is input into both the first feature analyzing branch B1 and the second feature analyzing branch B2. So, the first feature map F1 is input into both the dual attention network 402 and the pyramid pooling module 403.

Figure 4:
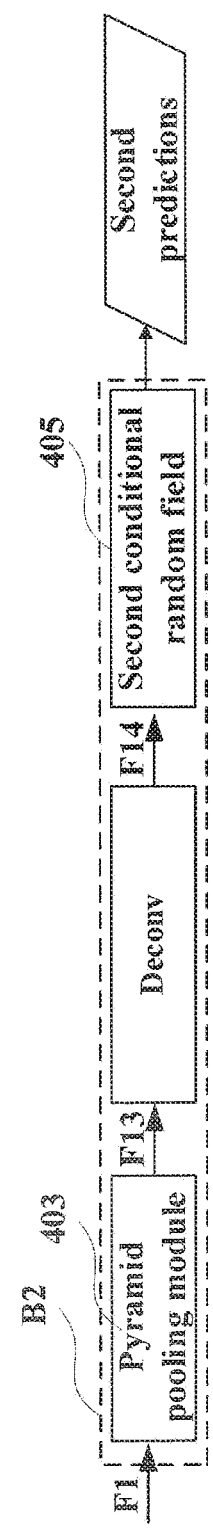
FIG. 4 is a schematic diagram of a structure of a second feature analyzing branch in some embodiments according to the present disclosure.

FIG. 4 is a schematic diagram of a structure of a second feature analyzing branch in some embodiments according to the present disclosure. Optionally, referring to FIG. 2 and FIG. 4, analyzing the first feature map F1 using the second feature analyzing branch B2 includes inputting the first feature map F1 to the pyramid pooling module 403, to generate a pyramid pooling feature map F13; performing a deconvolution process Deconv on the pyramid pooling feature map F13, to generate a deconvolutional pyramid pooling feature map F14; and inputting deconvolutional pyramid pooling feature map F14 into the second conditional random field 405, to generate the plurality of second predictions respectively corresponding to the plurality of subpixels of the input image.

Figure 5:
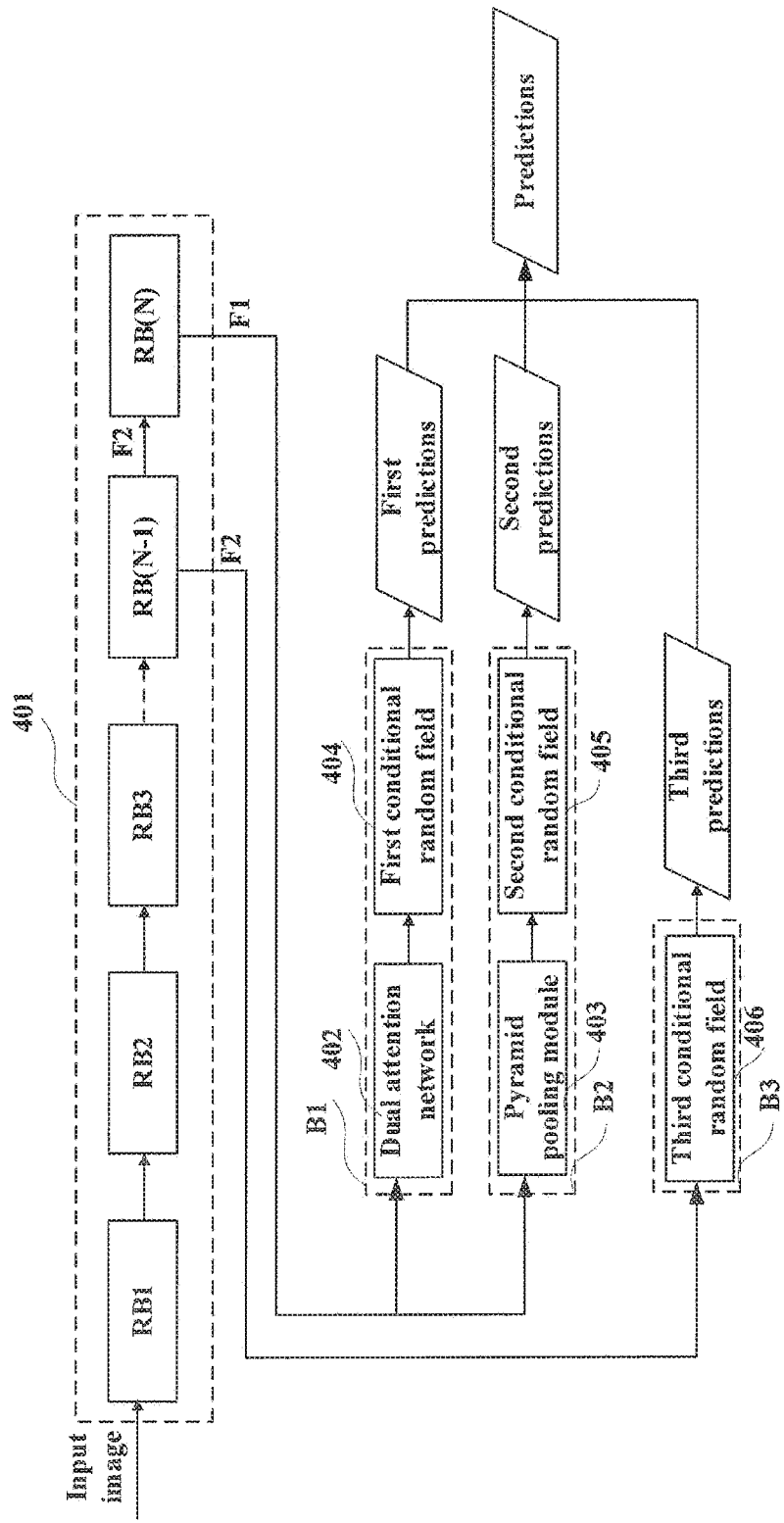
FIG. 5 is a schematic diagram of a structure of a neural network for semantically segmenting an input image in some embodiments according to the present disclosure.

FIG. 5 is a schematic diagram of a structure of a neural network for semantically segmenting an input image in some embodiments according to the present disclosure. In some embodiments, referring to FIG. 5, the M number of feature analyzing branches B further include a third feature analyzing branch B3. Optionally, the third feature analyzing branch B3 includes a third conditional random field 406.

Optionally, the one or more feature maps further include a second feature map F2 generated from an (N−1)-th residual block $RB_{N-1}$ of the N number of residual blocks RB. For example, the second feature map F2 is input into the third feature analyzing branch B3, and is input into the N-th residual block $RB_N$ of the N number of residual blocks RB for generating the first feature map F1.

Optionally, analyzing the one or more feature maps further includes analyzing the second feature map F2 using the third feature analyzing branch B3, to generate a plurality of third predictions respectively corresponding to the plurality of subpixels of the input image.

Figure 6:
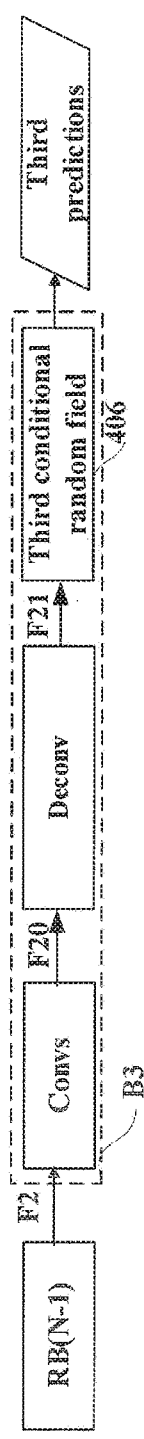
FIG. 6 is a schematic diagram of a structure of a third feature analyzing branch in some embodiments according to the present disclosure.

FIG. 6 is a schematic diagram of a structure of a third feature analyzing branch in some embodiments according to the present disclosure. Optionally, referring to FIG. 6, analyzing the second feature map F2 using the third feature analyzing branch B3 includes generating the second feature map F2 from the (N−1)-th residual block $RB_{N-1}$; performing a plurality of convolution processes Convs on the second feature map F2, to generate a convolutional second feature map F20; performing a deconvolution process Deconv on the convolutional second feature maps F20, to generate a deconvolutional second feature map F21; and inputting the deconvolutional second feature map F21 into the third conditional random field 406, to generate a plurality of third predictions respectively corresponding to the plurality of subpixels of the input image.

For example, the second feature map F2 output from the (N−1)-th residual block $RB_{N-1}$ has 1024 channels (e.g., a depth of 1024), which can be considered to represent local information of the input image. Three convolution processes including a convolution process using kernels of 1×1 and outputting a feature map having 512 channels, a convolution process using kernels of 3×3 and outputting a feature map having 512 channels, and a convolution process using kernels of 1×1 and outputting a feature map having (N+1) number of channels, are applied to the second feature map F2 to generate the convolutional second feature map F20 having (N+1) number of channels. The deconvolution process Deconv is applied on the convolutional second feature map F20 to generate the deconvolutional second feature map F21 having the spatial scale the same as the spatial scale of the input image and a depth (e.g., a total number of channels) the same as the total number of categories (e.g., classifications).

Optionally, the respective one of the plurality of predictions is an average value of the respective one of the plurality of first predictions, the respective one of the plurality of second predictions, and a respective one of the plurality of third predictions. The respective one of the plurality of predictions corresponds to the respective one of the plurality of subpixels of the input image, so the respective one of the plurality of predictions corresponding to the respective one of the plurality of subpixels of the input image is based on the respective one of the plurality of first predictions and the respective one of the plurality of second predictions corresponding to the respective one of the plurality of subpixels of the input image.

Figure 7:
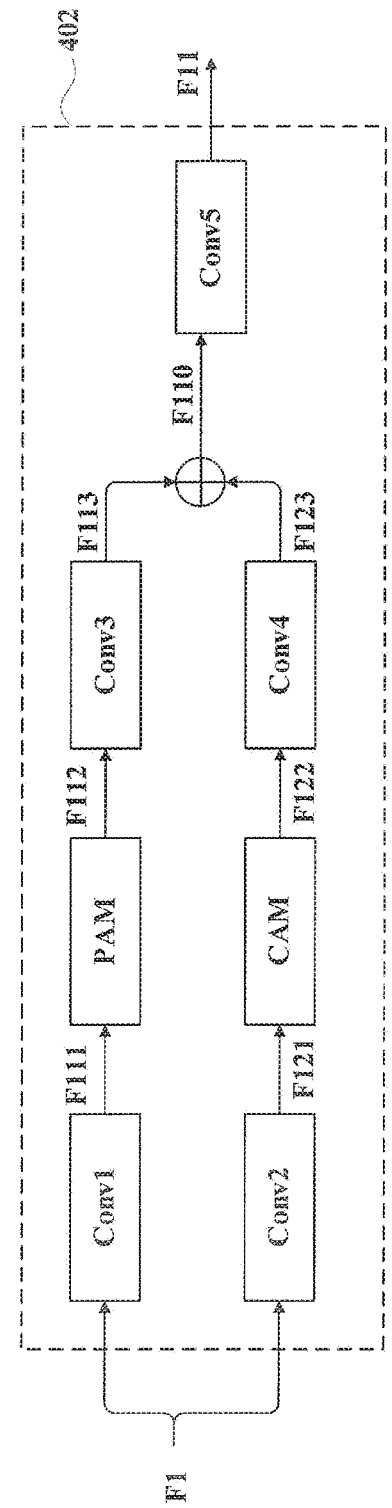
FIG. 7 is a schematic diagram of a structure of a dual attention network in some embodiments according to the present disclosure.

FIG. 7 is a schematic diagram of a structure of a dual attention network in some embodiments according to the present disclosure. In some embodiments, referring to FIG. 7, the dual attention network includes a position attention module PAM, and a channel attention module CAM. Optionally, the dual attention network further includes a first convolutional layer Conv1, a second convolutional layer Conv2, a third convolutional layer Conv3, and a fourth convolutional layer Conv 4.

Optionally, the first convolutional layer Conv1, the position attention module PAM, and the third convolutional layer Conv3 are sequentially connected. Optionally, the first convolutional layer Conv1 and the third convolutional layer Conv3 are a portion of the position attention module PAM.

Optionally, the second convolutional layer Conv2, the channel attention module CAM, and the fourth convolutional layer Conv4 are sequentially connected. Optionally, the second convolutional layer Conv2 and the fourth convolutional layer Conv4 are a portion of the channel attention module CAM.

In some embodiments, the first feature map F1 output from the residual network 401 has a scale of 7×7×2048. Optionally, the first feature map F1 is input into the first convolutional layer Conv1. Optionally, the first convolutional layer Conv1 processes the first feature map F1 and outputs a first position attention feature map F111. The first convolutional layer Conv1 has a kernel size of 3×3×2048 and an output channel of 512 (e.g., 512 kernels each of which has size of 3×3×2048). Optionally, the position attention module PAM receives and processes the first position attention feature map F111, and generates a second position attention feature map F112. Optionally, the third convolutional layer Conv3 receives and processes the second position attention feature map F112, and generates a third position attention feature map F113. The third convolutional layer Conv3 has a kernel size of 3×3×512 and an output channel of 512 (e.g., 512 kernels each of which has a size of 3×3×512).

Optionally, the first feature map F1 is input into the second convolutional layer Conv2. Optionally, the second convolutional layer Conv2 processes the first feature map F1 and outputs a first channel attention feature map F121. The second convolutional layer Conv2 has a kernel size of 3×3×2048 and an output channel of 512 (e.g., 512 kernels each of which has a size of 3×3×2048). Optionally, the channel attention module CAM receives and processes the first channel attention feature map F121, and generates a second channel attention feature map F122. Optionally, the fourth convolutional layer Conv4 receives and processes the second channel attention feature map F122, and generates a third channel attention feature map F123. The fourth convolutional layer Conv4 has a kernel size of 3×3×512 and an output channel of 512 (e.g., 512 kernels each of which has a size of 3×3×512).

Optionally, the third position attention feature map F113 and the third channel attention feature map F123 are aggregated to generate an aggregated feature map F110. Optionally, the aggregated feature map F110 are input into a fifth convolutional layer network Conv5 in the dual attention network 402 to generate the dual attention feature map F11. The fifth convolutional layer Conv5 has N number of kernels each of which has a size of 1×1×512, so that a total number of output channels of the fifth convolutional layer Conv5 is N which is equivalent to a total number of categories. N is a positive integer greater than 1.

FIG. 8 is a schematic diagram of a structure of a position attention module in some embodiments according to the present disclosure. In some embodiments, FIG. 8 shows a structure of a position attention module, as used herein, the term "position attention module" refers to a structure configured to obtain a contextual information of the input image in spatial dimension (See e.g., Jun Fu. Jing Liu, Haijie Tian, Yong Li, Yongjun Bao, Zhiwei Fang, Hanqing Lu, Dual Attention Network for Scene Segmentation, published at arXiv:1809.02983v4 [cs.CV], 21 Apr. 2019; the entire contents of which is hereby incorporated by reference).

For example, the position attention module is configured to use connections between features respectively in two different positions to augment expressions of features respectively in the two different positions. Optionally, convolutions are applied to a feature map A to reduce a scale or dimension of the feature map A to generate a feature map B and a feature map C. The scale of the feature map B is reshapes to generate a reshaped feature map B having a scale of ((H×W)×C'), and the scale of the feature map C is reshaped to generate a reshaped feature map C having a scale of (C'×(H×W)). A matrix product is performed on the reshaped feature map B and the reshaped feature map C to generate the first matrix ((H×W)×(H×W)) showing spatial relationship between two features of any two pixels. Subsequent to generate the first matrix, a softmax operation is performed on the first matrix to obtain an attention map S of each pixel to other pixels in the input image, the attention map S includes a plurality of response value of two pixels. If two features of two pixels are more similar, a response value of one pixel of the two pixels to another pixel of the two pixels is larger. Optionally, a convolution is applied to the feature map A to generate a feature map D, and the attention map S and the feature map D are combined by using the plurality of response value of the feature map D as weights, therefore, pixels having similar features are combined in a global view.

FIG. 9 is a schematic diagram of a structure of a channel attention module in some embodiments according to the present disclosure. In some embodiments, FIG. 9 shows a structure of a channel attention module, as used herein, the term "channel attention module" refers to a structure configured to obtain long-range contextual information of the input image in channel dimension (See e.g., Jun Fu, Jing Liu, Haijie Tian, Yong Li, Yongjun Bao, Zhiwei Fang, Hanqing Lu, Dual Attention Network for Scene Segmentation, published at arXiv:1809.02983v4 [cs.CV], 21 Apr. 2019; the entire contents of which is hereby incorporated by reference).

For example, the channel attention module is configured to use connections between features respectively in two different channels to augment specific sematic responsiveness in a channel. The process performed by the channel attention module is similar to the process performed by the position attention module. A difference between the process of the channel attention module and the process of the position attention module is a process of generating an attention map X. In the process of generating the attention map X, feature maps in any two channels are reshaped, and a matrix production are applied to feature maps in the any two channels to obtain a second matrix showing channel relationship between two channels. A softmax operation is performed on the second matrix to obtain the attention map X in channel dimension.

Figure 10:
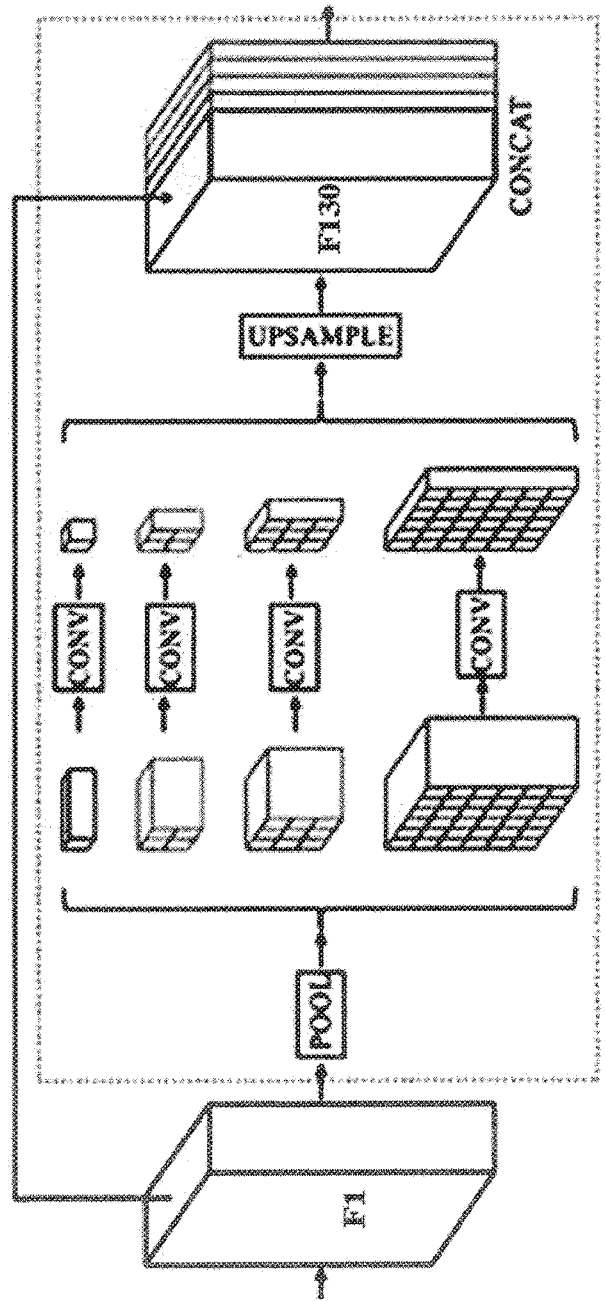
FIG. 10 is a schematic diagram of a structure of a pyramid pooling module in some embodiments according to the present disclosure.

FIG. 10 is a schematic diagram of a structure of a pyramid pooling module in some embodiments according to the present disclosure. FIG. 10 shows a structure of the pyramid pooling module, as used herein, the term "pyramid pooling module" refers to a structure configured to exploit global context information by different-region-based context aggregation (See e.g., Hengshuang Zhao, Jianping Shi, Xiaojuan Qi, Xiaogang Wang, Jiaya Jia, Pyramid Scene Parsing Network, published at arXiv:1612.01105v2 [cs.CV], 27 Apr. 2017; the entire contents of which is hereby incorporated by reference).

In some embodiments, referring to FIG. 10, the pyramid pooling module includes four levels of pooling processes. Optionally, the first level is configured to perform a global pooling to generate a pooled feature map having a spatial scale of 1×1. Remaining levels are configured to divide the feature map into different sub-regions and generate pooled feature maps. For example, the second level is configured to generate a pooled figure map having a spatial scale of 2×2, the third level is configured to generate a pooled figured map having a spatial scale of 3×3, and the fourth level is configured to generate a pooled figured map having a spatial scale of 6×6. A plurality of convolutions processes are respectively applied to the plurality of pooled figure maps generated from the plurality of levels. The plurality of convolutions are configured to respectively process the plurality of pooled figure maps and respective generate a plurality of depth-adjusted pooled figure maps each of which has a depth equivalent to L/L of a depth of the input of the pyramid pooling model (L is a total number of the plurality of levels of the pyramid pooling module), for example, the input of the pyramid pooling module has a depth of 2048, the plurality of depth-adjusted pooled figured maps has a depth of 512. Subsequently, up-sampling processes are applied to the plurality of depth-adjusted pooled figured maps and a plurality of up-sampled feature maps are generated. The plurality of up-sampled feature maps are concatenated as a concatenated feature map F130. Optionally, the plurality of up-sampled feature maps and the input (e.g., first feature map F1) are concatenated as the concatenated feature map F130.

Optionally, a convolution process having a kernel size 1×1 is applied to the concatenated feature map F130 to generate the pyramid pooling feature map F13 having (N+1) number of channels. Optionally, referring to FIG. 4, a deconvolution process Deconv is applied to the pyramid pooling feature map F13 to generate deconvolutional pyramid pooling feature map F14 having a spatial scale the same as the spatial scale of the input image, and a depth (e.g., a total number of channels) the same as the total number of categories (e.g., classifications).

As used herein, the term "pooling" refers to a type of down-sampling. Various methods may be used for pooling. Examples of methods suitable for pooling includes, but are not limited to, max-pooling, avg-polling, decimation, and demuxout.

As used herein, the term "down-sampling" refers to a process of extracting features of an input image (e.g., data, feature maps, signals), and outputting an output image (e.g., data, feature maps, signals) with a smaller scale.

As used herein, the term "up-sampling" refers to a process of adding more information to an input image (e.g., data, feature maps, signals), and outputting an outputting image with a larger scale.

As used herein, the term "conditional random field" refers to a process used to improve sematic labelling result or sematic classification result generated by a neural network (See e.g., Shuai Zheng, Sadeep Jayasumana, Bernardino Romera-Paredes, Vibhav Vineet, Zhizhong Su, Dalong Du, Chang Huang, Philip H. S. Torr, Conditional Random Fields as Recurrent Neural Networks, published at arXiv: 1502.03240v3 [cs.CV], 13 Apr. 2016; the entire contents of which is hereby incorporated by reference).

In some embodiments, a probability of a classification of a respective one of the plurality of subpixels of an input image is obtained using the conditional random Fields. Optionally, the probability of the classification of the respective one of the plurality of subpixels of the image is obtaining using the following function:

$$P\Big(X = x|I\Big) = \frac{1}{Z(I)}\exp(-E(x|I));$$

wherein $E(x|I)$ is an energy of a configuration $x \in L^N$, $Z(I)$ is a partition function.

An energy of a classification x is given by:

$$E(x) = \tau_i \psi_u(x_i) + \Sigma_{i \neq j} \psi_p(x_i, x_j);$$

wherein unary energy components $\psi_u(x_i)$ measure the inverse likelihood of a respective pixel i taking a classification $x_i$; pairwise energy components $\omega_p(x_i, x_j)$ measure a cost of assigning classifications $x_i$, $x_j$ to pixels i, j simultaneously.

Optionally, the unary energy components $\psi_u(x_i)$ is obtained from elements in the neural network described herein including the dual attention network, the pyramid pooling module, and the (N−1) residual blocks of the residual network.

Optionally, the pairwise energy components $\psi_p(x_i, x_j)$ is modelled as weighted Gaussians as follows, to describe relations between pixels and encourage similar pixels to be assigned with a same classification and pixels having relatively large difference to be assigned different classifications:

$$\psi_p(x_i, x_j) = \mu(x_i, x_j)\sum_{m=1}^{M} w^{(m)}k^{(m)}(f_i, f_j);$$

wherein each $k^{(m)}$ from m=1, ..., M, is a Gaussian kernel applied on feature vectors, configured to be a Gaussian weight measuring similarity between vectors of pixel i and vectors of pixel j; a feature vector $f_i$ of pixel i is derived from image features (e.g., a feature map) including spatial location and RGB values, for example (x, y, R. G, B); a function $\mu(x_i, x_j)$ is a classification compatibility function capturing the compatibility between different pairs of classifications, $w^m$ is a weight. For example, the $k(f_i, f_j)$ is defined as follows:

$$k(f_i, f_j) = w^1 \exp\left(-\frac{|p_i - p_j|^2}{2\theta_\alpha^2} - \frac{|I_i - I_j|^2}{2\theta_\beta^2}\right) + w^2 \exp\left(-\frac{|p_i - p_j|^2}{2\theta_\gamma^2}\right).$$

In some embodiments, the dual attention network is configured to perform attention analysis on two aspects including the positions attention aspect and the channel attention aspect, to obtain the dual attention feature map showing classifications of the plurality of pixels of the input image. The pyramid pooling module is configured to analyze input image in different levels including a global view level and different sub-region view level to obtain the pyramid pooling feature map showing classifications of the plurality of pixels of the input image. The conditional random field is configured to perform a finer segmentation of the classification provided from the previous portion of the neural network.

Optionally, a combination of the residual network, the dual attention network, and the first conditional random field can improve the accuracy of image segmentation and the classifications of pixels in the input image by analyzing the input image using the spatial attention mechanism and the channel attention mechanism.

Optionally, a combination of the residual network, the pyramid pooling module, and the second conditional random field can improve the accuracy of image segmentation and classifications of pixels in the input image, using the information obtained by analyzing the input image in different levels.

Optionally, a combination of the residual network and the third conditional random can improve the accuracy of image segmentation and classification of pixels in the input image by analyzing local information of the input image.

Optionally, the neural network described herein includes one or more combinations from a group consisting of the combination of the residual network, the dual attention network, and the conditional random field; the combination of the residual network, the pyramid pooling module, and the conditional random field; and the combination of the residual network and the conditional random, to improve the accuracy of image segmentation and classification of pixels in the input image.

In another aspect, the present disclosure provides an apparatus for semantically segmenting an input image using a neural network. In some embodiments, the apparatus for semantically segmenting the input image includes a memory; one or more processors. Optionally, the memory and the one or more processors are connected with each other. Optionally, the memory stores computer-executable instructions for controlling the one or more processors to extract features of the input image to generate one or more feature maps; and analyze the one or more feature maps to generate a plurality of predictions respectively corresponding to a plurality of subpixels of the input image. Optionally, controlling the one or more processors to extract features of the input image includes controlling the one or more processors to extract features of the input image using a residual network having N number of residual blocks, N being a positive integer greater than 1. Optionally, controlling the one or more processors to analyze the one or more feature maps includes controlling the one or more processors to analyze the one or more feature maps through M number of feature analyzing branches to generate M sets of predictions. Optionally, a respective one set of the M sets of predictions includes multiple predictions respectively corresponding to the plurality of subpixels of the input image. Optionally, a respective one of the plurality of predictions is an average value of corresponding ones of the M sets of predictions.

In some embodiments, the processor is a logical operation apparatus having data processing capabilities and/or program execution capabilities, such as Central Processing Unit (CPU), Field-Programmable Gate Array (FPGA), Microcontroller Unit (MCU), Digital Signal Processor (DSP), Application-Specific Integrated Circuit (ASIC), graphics processing unit (GPU). Optionally, one or a plurality of the processor can be configured to execute the relevancy calculation concurrently with a parallel processor. Optionally, one or a plurality of the processor can be configured to execute part of the relevancy calculation. Optionally, other processors can be configured to execute the remaining part of the relevancy calculation Various appropriate memory may be used in the present virtual image display apparatus. Examples of appropriate memory include, but are not limited to, various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, magnetic disk or tape, optical storage media such as compact disk (CD) or DVD (digital versatile disk), and other non-transitory media. Optionally, the memory is a non-transitory memory. Various appropriate processors may be used in the present virtual image display apparatus. Examples of appropriate processors include, but are not limited to, a general-purpose processor, a central processing unit (CPU), a microprocessor, a digital signal processor (DSP), a controller, a microcontroller, a state machine, etc.

Optionally, the M number of feature analyzing branches include a first feature analyzing branch including a dual attention network and a first conditional random field sequentially connected; and a second feature analyzing branch including a pyramid pooling module and a second conditional random field sequentially connected. Optionally, the one or more feature maps include a first feature map generated from an N-th residual block of the N number of residual blocks. Optionally, controlling the one or more processors to analyze the one or more feature maps includes controlling the one or more processors to analyze the first feature map using the first feature analyzing branch, to generate a plurality of first predictions respectively corresponding to the plurality of subpixels of the input image; and controlling the one or more processors to analyze the first feature map using the second feature analyzing branch, to generate a plurality of second predictions respectively corresponding to the plurality of subpixels of the input image.

Optionally, the M number of feature analyzing branches include a first feature analyzing branch having a dual attention network and a first conditional random field sequentially connected; and a second feature analyzing branch having a pyramid pooling module and a second conditional random field sequentially connected. Optionally, the one or more feature maps include a first feature map generated from an N-th residual block of the N number of residual blocks. Optionally, controlling the one or more processors to analyze the one or more feature maps includes controlling the one or more processors to analyze the first feature map using the first feature analyzing branch, to generate a plurality of first predictions respectively corresponding to the plurality of subpixels of the input image; and controlling the one or more processors to analyze the first feature map using the second feature analyzing branch, to generate a plurality of second predictions respectively corresponding to the plurality of subpixels of the input image.

Optionally, controlling the one or more processors to analyze the first feature map using the first feature analyzing branch includes controlling the one or more processors to input the first feature map to the dual attention network, to generate a dual attention feature map; controlling the one or more processors to perform a re-convolution process on the dual attention feature map, to generate a re-convolutional dual attention feature map; and controlling the one or more processors to input the re-convolutional dual attention feature map into the first conditional random field, to generate the plurality of first predictions respectively corresponding to the plurality of subpixels of the input image.

Optionally, the first feature map is input into both the dual attention network and the pyramid pooling module. Optionally, controlling the one or more processors to analyze the first feature map using the second feature analyzing branch includes controlling the one or more processors to input the first feature map to the pyramid pooling module, to generate a pyramid pooling feature map; controlling the one or more processors to perform a re-convolution process on the pyramid pooling feature map, to generate a re-convolutional pyramid pooling feature map; and controlling the one or more processors to input re-convolutional pyramid pooling feature map into the second conditional random field, to generate the plurality of second predictions respectively corresponding to the plurality of subpixels of the input image.

Optionally, the M number of feature analyzing branches further includes a third feature analyzing branch, and the third feature analyzing branch includes a third conditional random field. Optionally, the one or more feature maps further include a second feature map generated from an (N−1)-th residual block of the N number of residual blocks. Optionally, controlling the one or more processors to analyze the one or more feature maps further includes controlling the one or more processors to analyze the second feature map using the third feature analyzing branch, to generate a plurality of third predictions respectively corresponding to the plurality of subpixels of the input image.

Optionally, controlling the one or more processors to analyze the second feature map using the third feature analyzing branch includes controlling the one or more processors to perform a plurality of convolution processes on the second feature map, to generate a convolutional second feature map; controlling the one or more processors to perform a re-convolution process on the convolutional second feature map, to generate a re-convolutional second feature map; and controlling the one or more processors to input the re-convolutional second feature map into the third conditional random field, to generate a plurality of third predictions respectively corresponding to the plurality of subpixels of the input image.

Optionally, the respective one of the plurality of predictions is an average value of the respective one of the plurality of first predictions, the respective one of the plurality of second predictions, and a respective one of the plurality of third predictions.

Optionally, the second feature map is input into the third feature analyzing branch, and is input into the N-th residual block of the N number of residual blocks for generating the first feature map.

Optionally, the residual network is a dilated residual network.

Figure 11:
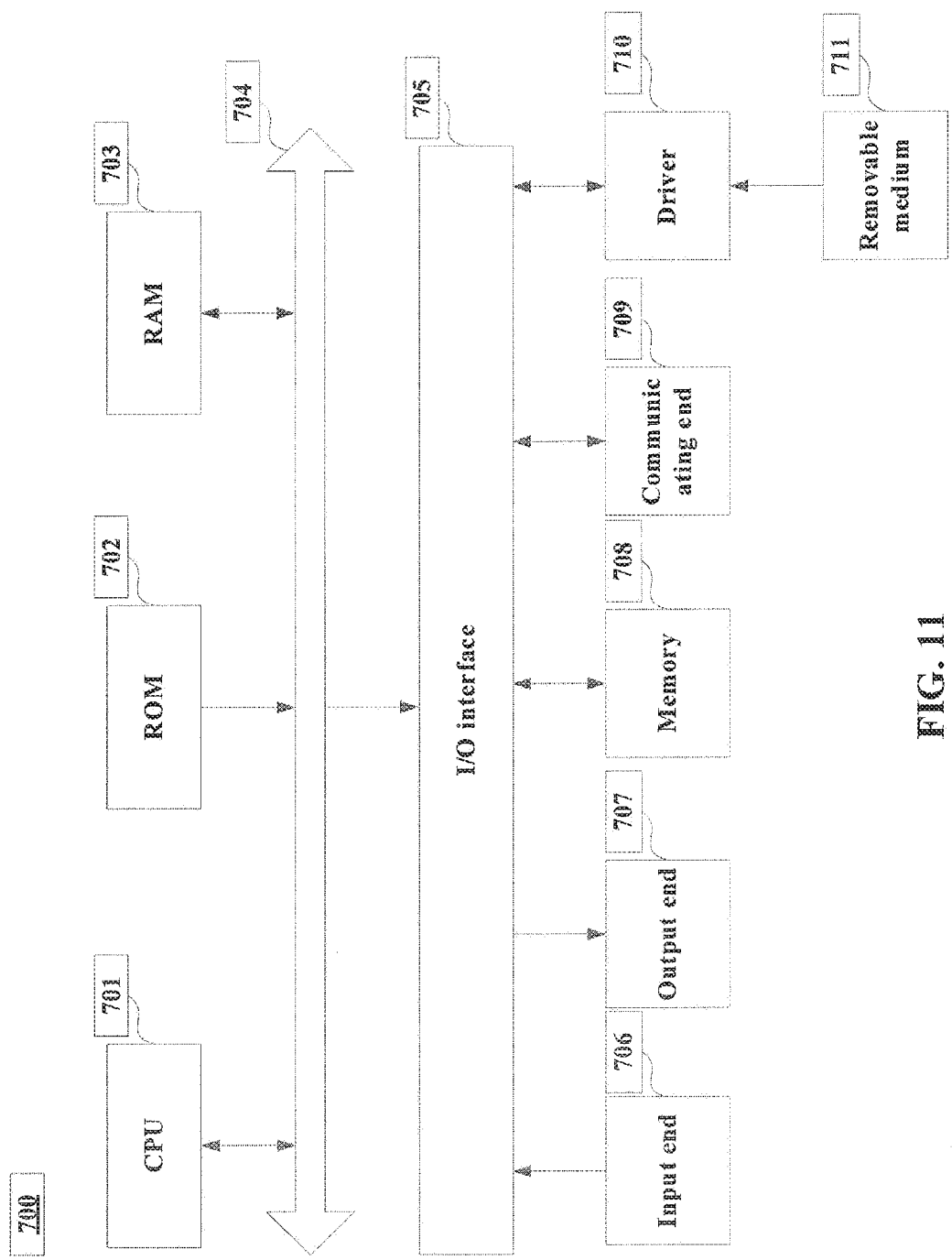
FIG. 11 is a schematic diagram of a structure of an apparatus for semantically segmenting an input image in some embodiments according to the present disclosure.

FIG. 11 is a schematic diagram of a structure of an apparatus for semantically segmenting an input image in some embodiments according to the present disclosure. Referring to FIG. 11, in some embodiments, the apparatus 700 includes a CPU 701 which can execute various appropriate programs stored in the ROM 702 or in the RAM 703, the programs in RAM 703 are loaded from the memory 708.

Optionally, various appropriate data and programs needed to operate the apparatus 700 are stored in the RAM 703. Optionally, the CPU 701, ROM 702, and RAM 703 are connected to each other through a bus 704. Optionally, the I/O interface 705 is also connected to the bus 704.

Optionally, an input end 706, an output end 707, the memory 708, a communicating end 709, are connected to the I/O interface 705. For example, the input end 706 includes a keyboard, a mouse, etc. The output end includes a cathode ray tube (CRT), a liquid crystal display (LCD), and a speaker. The communicating end 709 includes LAN card, a modem, etc. The communication end 709 performs communication processing via a network such as the Internet.

Optionally, a driver 710 is also connected to the I/O interface 705.

Optionally, a removable medium 711 such as magnetic disk, an optical disk, a magneto-optical disk, a semiconductor memory, etc. are connected to the driver 710, which allows programs in the removable medium to be read and to be installed in the memory 708.

Figure 12:
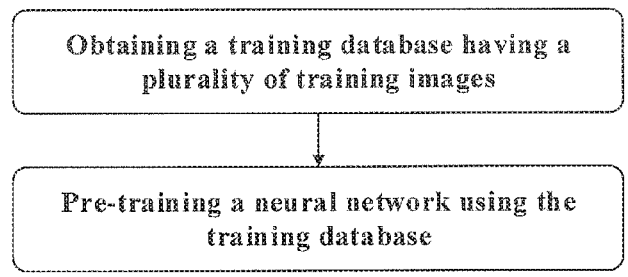
FIG. 12 is a flow chart illustrating a method of pre-training an apparatus for semantically segmenting an input image in some embodiments according to the present disclosure.

In another aspect, the present disclosure also provides a method of pre-training an apparatus for semantically segmenting an input image using a neural network. FIG. 12 is a flow chart illustrating a method of pre-training an apparatus for semantically segmenting an input image in some embodiments according to the present disclosure. In some embodiments, referring to FIG. 12, the method of pre-training an apparatus includes obtaining a training database having a plurality of training images; and pre-training the neural network using the training database. Optionally, a respective one of the plurality of training images has a plurality of pre-determined predictions respectively corresponding to a plurality of subpixels of the respective one of the plurality of training images.

Optionally, the neural network includes a first portion configured to extract feature maps, and a second portion configured to analyze feature maps. Optionally, the first portion configured to extract feature maps includes a residual network. For example, the residual network includes a plurality of residual blocks. Optionally, the residual network is a dilated residual network. Optionally, the second portion configured to analyze feature maps is formed based on the attention mechanism, pixel correlation mechanism, and multi-level information of a feature map.

Optionally, the training database is a professional image database, or is obtained by collecting a huge number of sample images, or includes sample images suitable for pre-training the neural network, and the sample images are obtained by performing augment on the limited number of images.

Figure 13:
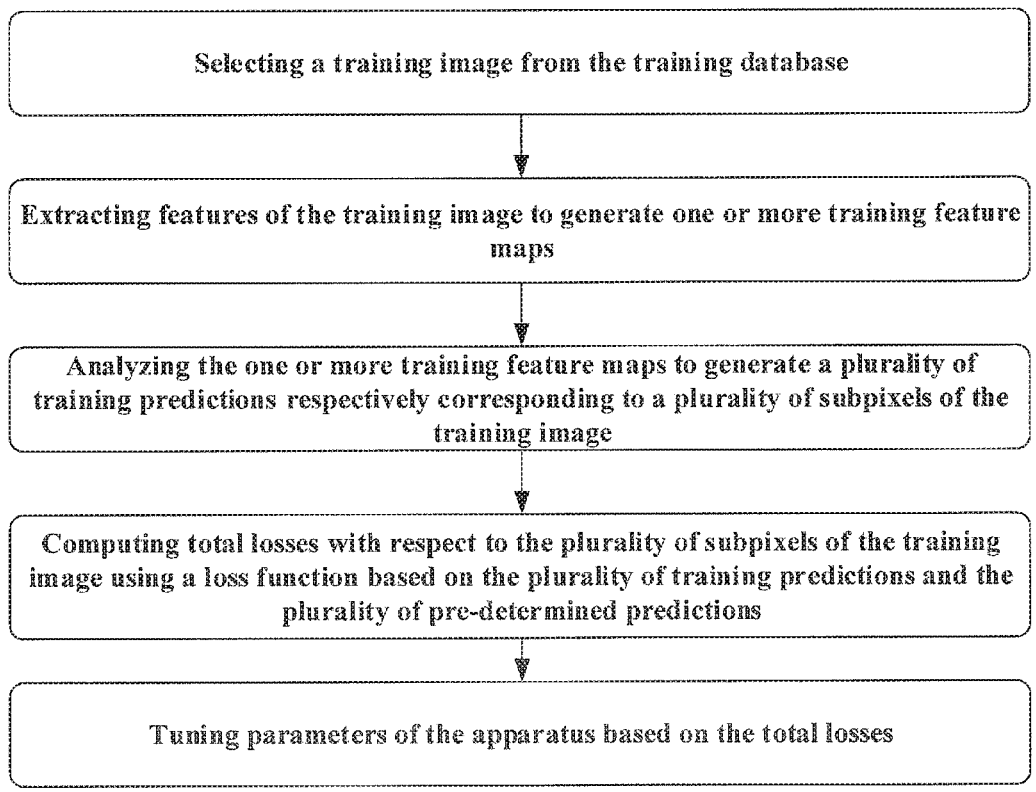
FIG. 13 is a flow chart illustrating a method of pre-training an apparatus for semantically segmenting an input image in some embodiments according to the present disclosure.

FIG. 13 is a flow chart illustrating a method of pre-training an apparatus for semantically segmenting an input image in some embodiments according to the present disclosure. In some embodiments, referring to FIG. 13, the method of pre-training further includes selecting a training image from the training database; extracting features of the training image to generate one or more training feature maps; analyzing the one or more training feature maps to generate a plurality of training predictions respectively corresponding to a plurality of subpixels of the training image; computing total losses with respect to the plurality of subpixels of the training image using a loss function based on the plurality of training predictions and the plurality of pre-determined predictions; and tuning parameters of the apparatus based on the total losses.

Optionally, extracting features of the training image includes extracting features of the training image using a residual network having N number of residual blocks, N being a positive integer greater than 1.

Optionally, analyzing the one or more training feature maps includes analyzing the one or more training feature maps through M number of feature analyzing branches respectively, to generate M sets of training predictions. Optionally, a respective one set of the M sets of training predictions includes multiple training predictions respectively corresponding to the plurality of subpixels of the training image. Optionally, a respective one of the plurality of training predictions is an average value of corresponding ones of the M sets of training predictions.

Optionally, computing the total losses with respect to the plurality of subpixels of the training image includes computing M sets of losses. Optionally, a respective one set of the M sets of losses includes multiple losses respectively corresponding to the plurality of subpixels of the training image. Optionally, the total losses with respect to the plurality of subpixels of the training image is a weighted average of corresponding ones of the M sets of losses.

In some embodiments, the M number of feature analyzing branches includes a first feature analyzing branch having a dual attention network and a first conditional random field sequentially connected; and a second feature analyzing branch having a pyramid pooling module and a second conditional random field sequentially connected. Optionally, the one or more training feature maps includes a first training feature map generated from an N-th residual block of the N number of residual blocks.

Optionally, analyzing the one or more training feature maps includes analyzing the first training feature map using the first feature analyzing branch, to generate a plurality of first training predictions respectively corresponding to the plurality of subpixels of the training image; and analyzing the first training feature map using the second feature analyzing branch, to generate a plurality of second training predictions respectively corresponding to the plurality of subpixels of the input image.

Optionally, computing the total losses with respect to the plurality of subpixels of the training image includes computing first losses respectively corresponding to the plurality of subpixels of the training image and between the plurality of first training predictions and the plurality of pre-determined predictions using a softmax cross-entropy loss function; and computing second losses respectively corresponding to the plurality of subpixels of the training image and between the plurality of second training predictions and the plurality of pre-determined predictions using the softmax cross-entry loss function.

As used herein, the term "softmax cross entropy loss function" refers to a softmax function plus a cross-entropy loss. Optionally, the cross entropy can be used to define the loss function in machine learning and optimization. The cross entropy loss is ubiquitous in modern deep neural networks and in statistical learning theory. Optionally, the softmax function is often used in the final layer of a neural network-based classifier. Such networks are commonly trained under a log loss (or cross-entropy). For example, the softmax function squashes a vector in the range (0, 1) and all the resulting elements add up to 1.

$$f(z_k) = \frac{e^{z_k}}{\sum_{i=1}^{N} e^{z_i}};$$

wherein N represents a total number of classifications in a prediction corresponding to a respective subpixel of a training image; $f(z_k)$ is a normalized probability of k-th classification in a normalized training prediction of the respective subpixel of the training image; $z_k$ is a probability of k-th classification in a training prediction of the respective subpixel of the training image; $z_i$ is a probability of i-th classification in a training prediction of the respective subpixel of the training image.

$$\text{loss} = -\sum_{i=1}^{N} y_i \log f(z_i);$$

wherein N represents a total number of classifications in a prediction corresponding to a respective subpixel of a training image; $y_i$ is a score of i-th classification of a pre-determined prediction of the respective subpixel of the training image; $f(z_i)$ is a normalized probability of i-th classification in a normalized training prediction of the respective subpixel of the training image.

Optionally, the scores of the N number of classifications are one-hot, so only the positive classification keeps its term in the loss function, since $y_i=1$, if the respective subpixel is in the pre-determined classification, otherwise, $y_i=0$. Therefore, the loss function can be shown as follows:

$$\text{loss} = -\sum_{i=1}^{N} y_i \log f(z_i) = -\log f(z_k);$$

wherein N represents a total number of classifications in a prediction corresponding to a respective subpixel of a training image; $y_i$ is a score of i-th classification of a pre-determined prediction of the respective subpixel of the training image; $f(z_i)$ is a normalized probability of i-th classification in a normalized training prediction of the respective subpixel of the training image; $f(z_k)$ is a normalized probability of k-th classification in a normalized training prediction of the respective subpixel of the training image; k-th classification corresponds to the pre-determined classification of the respective subpixel.

For example, referring to FIG. 3, the deconvolutional dual attention feature map F12 is input to the first conditional random field 404, the first conditional random field 404 generates the first training predictions $z_{k1}$. Based on the first training predictions $z_{k1}$ and the pre-determined classifications of the plurality of subpixels, the first losses are obtained using the loss function.

For example, referring to FIG. 4, the deconvolutional pyramid pooling feature map F14 is input to the second conditional random field 405, the second conditional random field generates the second training predictions $z_{k2}$. Based on the second training predictions $z_{k2}$ and the pre-determined classifications of the plurality of subpixels, the second losses are obtained using the loss function.

Figure 14:
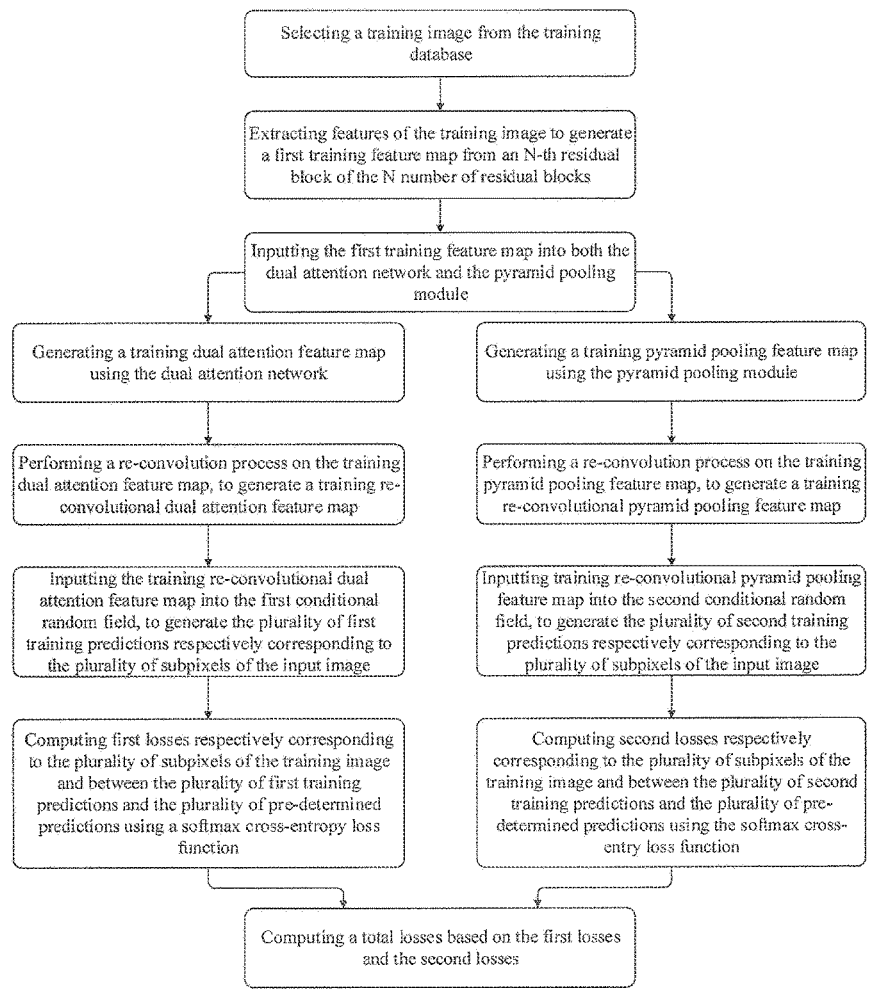
FIG. 14 is a flow chart illustrating a method of pre-training an apparatus for semantically segmenting an input image in some embodiments according to the present disclosure.

FIG. 14 is a flow chart illustrating a method of pre-training an apparatus for semantically segmenting an input image in some embodiments according to the present disclosure. In some embodiments, referring to FIG. 14, the pre-training method includes selecting a training image from the training database; extracting features of the training image to generate a first training feature map from an N-th residual block of the N number of residual blocks; inputting the first training feature map into both the dual attention network and the pyramid pooling module; analyzing the first training feature map using the first feature analyzing branch; analyzing the first training feature map using the second feature analyzing branch; computing the first losses; computing the second losses; and computing the total losses.

Optionally, analyzing the first training feature map using the first feature analyzing branch includes inputting the first training feature map to the dual attention network, to generate a training dual attention feature map; performing a re-convolution process on the training dual attention feature map, to generate a training re-convolutional dual attention feature map; and inputting the training re-convolutional dual attention feature map into the first conditional random field, to generate the plurality of first training predictions respectively corresponding to the plurality of subpixels of the input image.

Optionally, analyzing the first training feature map using the second feature analyzing branch includes inputting the first training feature map to the pyramid pooling module, to generate a training pyramid pooling feature map; performing a re-convolution process on the training pyramid pooling feature map, to generate a training re-convolutional pyramid pooling feature map; and inputting training re-convolutional pyramid pooling feature map into the second conditional random field, to generate the plurality of second training predictions respectively corresponding to the plurality of subpixels of the input image.

Optionally, the total losses respectively corresponding to the plurality of subpixels of the training image is a weighted average of the first losses and the second losses respectively corresponding to the plurality of subpixels of the training image. For example, the total losses Loss are obtained using the following equation:

$$Loss=Loss1+\lambda_1 Loss2;$$

wherein Loss is a respective one of the total losses corresponding to a respective subpixel of the plurality of subpixels of the training image. Loss1 is a respective one of the first losses corresponding to the respective subpixel of the plurality of subpixels of the training image. Loss2 is a respective one of the second losses corresponding to the respective subpixel of the plurality of subpixels of the training image. $\lambda_1$ is a weight.

In one example, computing the first losses includes normalizing the plurality of first training predictions using a softmax function, to generate a plurality of normalized first training predictions; and computing the first losses between the plurality of normalized first training predictions and the plurality of pre-determined predictions.

In another example, computing the second losses includes normalizing the plurality of second training predictions using the softmax function, to generate a plurality of normalized second training predictions; and computing the second losses between the plurality of normalized second training predictions and the plurality of pre-determined predictions.

In some embodiments, the M number of feature analyzing branches further include a third feature analyzing branch, and the third feature analyzing branch includes a third conditional random field. Optionally, the one or more training feature maps further includes a second training feature map generated from (N−1)-th residual block of the N number of residual blocks. Optionally, analyzing the one or more training feature maps further includes analyzing the second training feature map using the third feature analyzing branch, to generate a plurality of third training predictions respectively corresponding to the plurality of subpixels of the input image.

Figure 15:
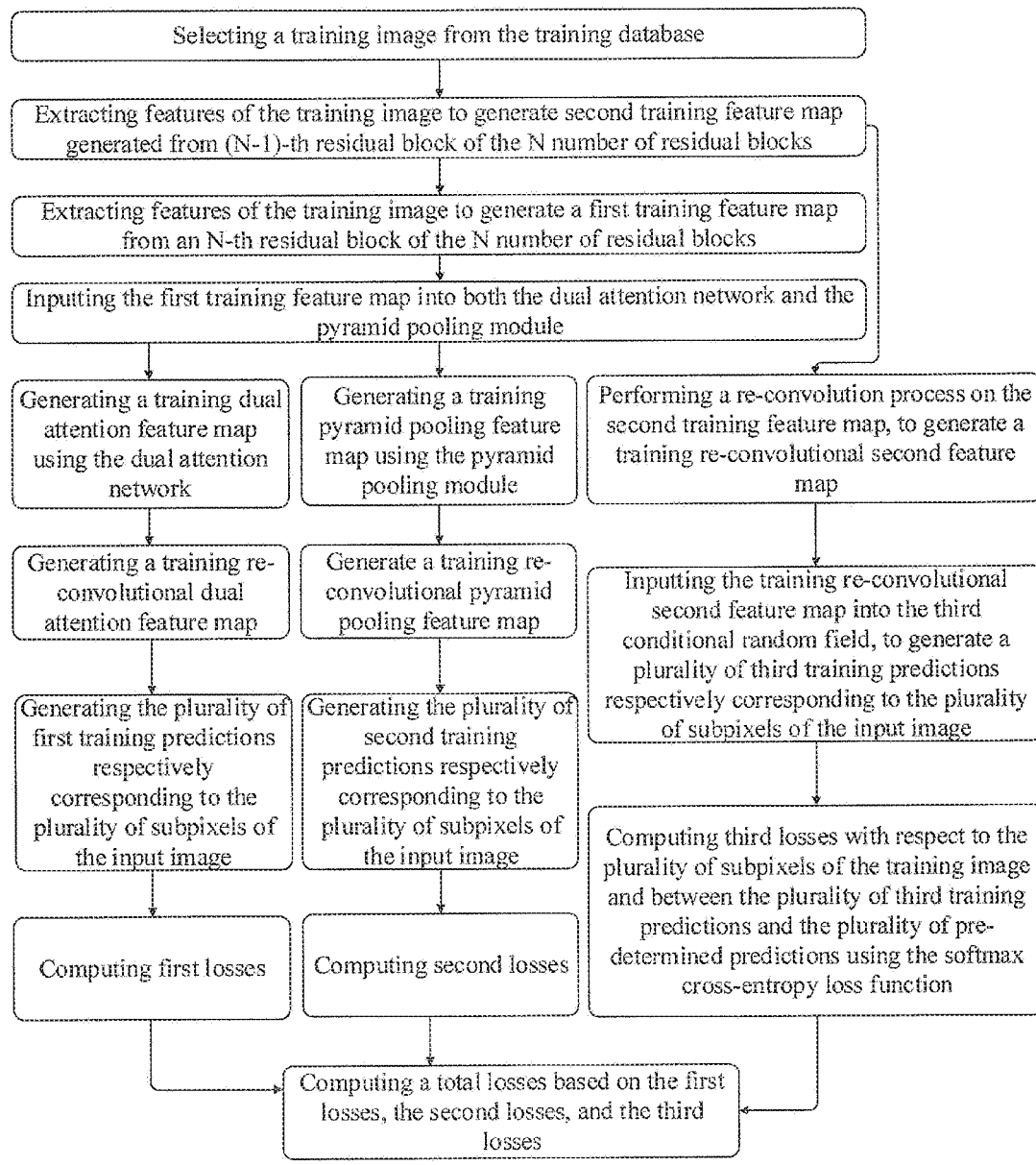
FIG. 15 is a flow chart illustrating a method of pre-training an apparatus for semantically segmenting an input image in some embodiments according to the present disclosure.

FIG. 15 is a flow chart illustrating a method of pre-training an apparatus for semantically segmenting an input image in some embodiments according to the present disclosure. In some embodiments, referring to FIG. 15, the pre-training method further includes extracting features of the training image to generate second training feature map generated from (N−1)-th residual block of the N number of residual blocks; analyzing the second training feature map using the third feature analyzing branch; computing third losses; and computing the total losses.

Optionally, analyzing the second training feature map using the third feature analyzing branch includes performing a plurality of convolution processes on the second training feature map, to generate a convolutional second training feature map; performing a re-convolution process on the convolutional second training feature map, to generate a training re-convolutional second feature map; and inputting the training re-convolutional second feature map into the third conditional random field, to generate a plurality of third training predictions respectively corresponding to the plurality of subpixels of the input image.

Optionally, computing the total losses with respect to the plurality of subpixels of the training image further include computing third losses with respect to the plurality of subpixels of the training image and between the plurality of third training predictions and the plurality of pre-determined predictions using the softmax cross-entropy loss function.

Optionally, the total losses respectively corresponding to the plurality of subpixels of the training image is a weighted average of the first losses, the second losses, and the third losses respectively corresponding to the plurality of subpixels of the training image. For example, the total losses Loss are obtained using the following equation:

$$Loss=Loss1+\lambda_1 Loss2+\lambda_2 Loss3;$$

wherein Loss is a respective one of the total losses corresponding to a respective subpixel of the plurality of subpixels of the training image. Loss1 is a respective one of the first losses corresponding to the respective subpixel of the plurality of subpixels of the training image. Loss2 is a respective one of the second losses corresponding to the respective subpixel of the plurality of subpixels of the training image. Loss3 is a respective one of the third losses corresponding to the respective subpixel of the plurality of subpixels of the training image $\lambda_1$ and $\lambda_2$ are weights.

For example, computing the third losses includes normalizing the plurality of third training predictions using the softmax cross-entropy loss function, to generate a plurality of normalized third training predictions; and computing the third losses between the plurality of normalized third training predictions and the plurality of pre-determined predictions.

Optionally, the pre-training method further include iterating pre-training the neural network until the total loss satisfy a threshold value. For example, the threshold value is a minimum value of the total loss.

Figure 16:
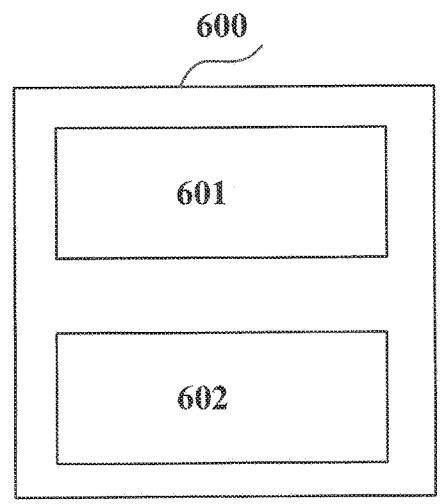
FIG. 16 is a schematic diagram of a structure of a training apparatus for pre-training an apparatus for semantically segmenting an input image in some embodiments according to the present disclosure.

In another aspect, the present disclosure provides a training apparatus for pre-training an apparatus for semantically segmenting an input image using a neural network. FIG. 16 is a schematic diagram of a structure of a training apparatus for pre-training an apparatus for semantically segmenting an input image in some embodiments according to the present disclosure. Referring to FIG. 16, in some embodiments, the training apparatus 600 includes a training image obtaining unit 601 configured to obtain a plurality of training images; and a training unit 602 configured to pre-train the network to semantically segment an input image.

Optionally, the training unit 602 includes a portion configured to extract feature maps, and a portion configured to analyze feature maps. Optionally, the portion configured to extract feature maps includes a residual network. For example, the residual network includes a plurality of residual blocks. Optionally, the residual network is a dilated residual network. Optionally, the portion configured to analyze feature maps is formed based on the attention mechanism, pixel correlation mechanism, and multi-level information of a feature map.

In some embodiments, the training apparatus includes a memory; one or more processors. Optionally, the memory and the one or more processors are connected with each other. Optionally, the memory stores computer-executable instructions for controlling the one or more processors to obtain a training database having a plurality of training images, a respective one of the plurality of training images having a plurality of pre-determined predictions respectively corresponding to a plurality of subpixels of the respective one of the plurality of training images; select a training image from the training database; extract features of the training image to generate one or more training feature maps; analyze the one or more training feature maps to generate a plurality of training predictions respectively corresponding to a plurality of subpixels of the training image; compute total losses with respect to the plurality of subpixels of the training image using a loss function based on the plurality of training predictions and the plurality of pre-determined predictions, and tune parameters of the apparatus based on the total losses.

Optionally, controlling the one or more processors to extract features of the training image includes controlling the one or more processors to extract features of the training image using a residual network having N number of residual blocks, N being a positive integer greater than 1.

Optionally, controlling the one or more processors to analyze the one or more training feature maps includes controlling the one or more processors to analyze the one or more training feature maps through M number of feature analyzing branches respectively, to generate M sets of training predictions. Optionally, a respective one set of the M sets of training predictions includes multiple training predictions respectively corresponding to the plurality of subpixels of the training image. Optionally, a respective one of the plurality of training predictions is an average value of corresponding ones of the M sets of training predictions.

Optionally, controlling the one or more processors to compute the total losses with respect to the plurality of subpixels of the training image includes controlling the one or more processors to compute M sets of losses. Optionally, a respective one set of the M sets of losses includes multiple losses respectively corresponding to the plurality of subpixels of the training image. Optionally, the total losses with respect to the plurality of subpixels of the training image is a weighted average of corresponding ones of the M sets of losses.

Optionally, wherein the M number of feature analyzing branches include a first feature analyzing branch having a dual attention network and a first conditional random field sequentially connected; and a second feature analyzing branch having a pyramid pooling module and a second conditional random field sequentially connected. Optionally, the one or more training feature maps include a first training feature map generated from an N-th residual block of the N number of residual blocks. Optionally, controlling the one or more processors to analyze the one or more training feature maps includes controlling the one or more processors to analyze the first training feature map using the first feature analyzing branch, to generate a plurality of first training predictions respectively corresponding to the plurality of subpixels of the training image; and controlling the one or more processors to analyze the first training feature map using the second feature analyzing branch, to generate a plurality of second training predictions respectively corresponding to the plurality of subpixels of the input image. Optionally, controlling the one or more processors to compute the total losses with respect to the plurality of subpixels of the training image includes controlling the one or more processors to compute first losses respectively corresponding to the plurality of subpixels of the training image and between the plurality of first training predictions and the plurality of pre-determined predictions using a softmax cross-entropy loss function; and controlling the one or more processors to compute second losses respectively corresponding to the plurality of subpixels of the training image and between the plurality of second training predictions and the plurality of pre-determined predictions using the softmax cross-entry loss function.

Optionally, controlling the one or more processors to analyze the first training feature map using the first feature analyzing branch includes controlling the one or more processors to input the first training feature map to the dual attention network, to generate a training dual attention feature map; controlling the one or more processors to perform a re-convolution process on the training dual attention feature map, to generate a training re-convolutional dual attention feature map; and controlling the one or more processors to input the training re-convolutional dual attention feature map into the first conditional random field, to generate the plurality of first training predictions respectively corresponding to the plurality of subpixels of the input image.

Optionally, the first training feature map is input into both the dual attention network and the pyramid pooling module. Optionally, controlling the one or more processors to analyze the first training feature map using the second feature analyzing branch includes controlling the one or more processors to input the first training feature map to the pyramid pooling module, to generate a training pyramid pooling feature map; controlling the one or more processors to perform a re-convolution process on the training pyramid pooling feature map, to generate a training re-convolutional pyramid pooling feature map; and controlling the one or more processors to input training re-convolutional pyramid pooling feature map into the second conditional random field, to generate the plurality of second training predictions respectively corresponding to the plurality of subpixels of the input image.

In one example, controlling the one or more processors to compute the first losses includes controlling the one or more processors to normalize the plurality of first training predictions using a softmax function, to generate a plurality of normalized first training predictions; and controlling the one or more processors to compute the first losses between the plurality of normalized first training predictions and the plurality of pre-determined predictions.

In another example, controlling the one or more processors to compute the second losses includes controlling the one or more processors to normalize the plurality of second training predictions using the softmax function, to generate a plurality of normalized second training predictions; and controlling the one or more processors to compute the second losses between the plurality of normalized second training predictions and the plurality of pre-determined predictions.

Optionally, the M number of feature analyzing branches further include a third feature analyzing branch, and the third feature analyzing branch includes a third conditional random field. Optionally, the one or more training feature maps further includes a second training feature map generated from (N−1)-th residual block of the N number of residual blocks. Optionally, controlling the one or more processors to analyze the one or more training feature maps further includes controlling the one or more processors to analyze the second training feature map using the third feature analyzing branch, to generate a plurality of third training predictions respectively corresponding to the plurality of subpixels of the input image.

Optionally, controlling the one or more processors to analyze the second training feature map using the third feature analyzing branch includes controlling the one or more processors to perform a plurality of convolution processes on the second training feature map, to generate a convolutional second training feature map; controlling the one or more processors to perform a re-convolution process on the convolutional second training feature map, to generate a training re-convolutional second feature map; and controlling the one or more processors to input the training re-convolutional second feature map into the third conditional random field, to generate a plurality of third training predictions respectively corresponding to the plurality of subpixels of the input image. Optionally, controlling the one or more processors to compute the total losses with respect to the plurality of subpixels of the training image further includes controlling the one or more processors to compute third losses with respect to the plurality of subpixels of the training image and between the plurality of third training predictions and the plurality of pre-determined predictions using the softmax cross-entropy loss function.

Optionally, the total losses respectively corresponding to the plurality of subpixels of the training image is a weighted average of the first losses, the second losses, and the third losses respectively corresponding to the plurality of subpixels of the training image.

For example, controlling the one or more processors to compute the third losses includes controlling the one or more processors to normalize the plurality of third training predictions using the softmax cross-entropy loss function, to generate a plurality of normalized third training predictions; and controlling the one or more processors to compute the third losses between the plurality of normalized third training predictions and the plurality of pre-determined predictions.

In another aspect, the present disclosure provides a computer-program product including a non-transitory tangible computer-readable medium having computer-readable instructions thereon. In some embodiments, the computer-readable instructions being executable by a processor to cause the processor to perform extracting features of an input image to generate one or more feature maps; and analyzing the one or more feature maps to generate a plurality of predictions respectively corresponding to a plurality of subpixels of the input image. Optionally, extracting features of the input image includes extracting features of the input image using a residual network having N number of residual blocks, N being a positive integer greater than 1. Optionally, analyzing the one or more feature maps includes analyzing the one or more feature maps through M number of feature analyzing branches to generate M sets of predictions. Optionally, a respective one set of the M sets of predictions includes multiple predictions respectively corresponding to the plurality of subpixels of the input image. Optionally, a respective one of the plurality of predictions is an average value of corresponding ones of the M sets of predictions.

Optionally, the M number of feature analyzing branches includes a first feature analyzing branch having a dual attention network and a first conditional random field sequentially connected; and a second feature analyzing branch having a pyramid pooling module and a second conditional random field sequentially connected. Optionally, the one or more feature maps include a first feature map generated from an N-th residual block of the N number of residual blocks.

Optionally, analyzing the one or more feature maps includes analyzing the first feature map using the first feature analyzing branch, to generate a plurality of first predictions respectively corresponding to the plurality of subpixels of the input image; and analyzing the first feature map using the second feature analyzing branch, to generate a plurality of second predictions respectively corresponding to the plurality of subpixels of the input image.

Optionally, analyzing the first feature map using the first feature analyzing branch includes inputting the first feature map to the dual attention network, to generate a dual attention feature map; performing a re-convolution process on the dual attention feature map, to generate a re-convolutional dual attention feature map; and inputting the re-convolutional dual attention feature map into the first conditional random field, to generate the plurality of first predictions respectively corresponding to the plurality of subpixels of the input image.

Optionally, the first feature map is input into both the dual attention network and the pyramid pooling module. Optionally, analyzing the first feature map using the second feature analyzing branch includes inputting the first feature map to the pyramid pooling module, to generate a pyramid pooling feature map; performing a re-convolution process on the pyramid pooling feature map, to generate a re-convolutional pyramid pooling feature map; and inputting re-convolutional pyramid pooling feature map into the second conditional random field, to generate the plurality of second predictions respectively corresponding to the plurality of subpixels of the input image.

Optionally, the M number of feature analyzing branches further include a third feature analyzing branch, and the third feature analyzing branch includes a third conditional random field. Optionally, the one or more feature maps further include a second feature map generated from an (N−1)-th residual block of the N number of residual blocks. Optionally, analyzing the one or more feature maps further includes analyzing the second feature map using the third feature analyzing branch, to generate a plurality of third predictions respectively corresponding to the plurality of subpixels of the input image.

Optionally, analyzing the second feature map using the third feature analyzing branch includes performing a plurality of convolution processes on the second feature map, to generate a convolutional second feature map; performing a re-convolution process on the convolutional second feature map, to generate a re-convolutional second feature map; and inputting the re-convolutional second feature map into the third conditional random field, to generate a plurality of third predictions respectively corresponding to the plurality of subpixels of the input image.

Optionally, the respective one of the plurality of predictions is an average value of the respective one of the plurality of first predictions, the respective one of the plurality of second predictions, and a respective one of the plurality of third predictions.

Optionally, the second feature map is input into the third feature analyzing branch, and is input into the N-th residual block of the N number of residual blocks for generating the first feature map.

Optionally, the residual network is a dilated residual network.

Various illustrative networks, segments, units, channels, modules, fields, blocks, layers, and other operations described in connection with the configurations disclosed herein may be implemented as electronic hardware, computer software, or combinations of both. Such networks, segments, units, channels, modules, fields, blocks, layers, and other operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices. e.g., a combination of a DSP and a microprocessor, a plurality of microprocessors, one or more microprocessors in conjunction with a DSP core, or any other such configuration. A software module may reside in a non-transitory storage medium such as RAM (random-access memory). ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of semantically segmenting an input image using a neural network, comprising:
   extracting features of the input image to generate one or more feature maps; and
   analyzing the one or more feature maps to generate a plurality of predictions respectively corresponding to a plurality of subpixels of the input image;
   wherein extracting features of the input image comprises extracting features of the input image using a residual network having N number of residual blocks, N being a positive integer greater than 1;
   wherein analyzing the one or more feature maps comprises analyzing the one or more feature maps through M number of feature analyzing branches to generate M sets of predictions;
   a respective one set of the M sets of predictions comprises multiple predictions respectively corresponding to the plurality of subpixels of the input image; and
   a respective one of the plurality of predictions is an average value of corresponding ones of the M sets of predictions.

2. The method of claim 1, wherein the M number of feature analyzing branches comprise:
   a first feature analyzing branch comprising a dual attention network and a first conditional random field sequentially connected; and
   a second feature analyzing branch comprising a pyramid pooling module and a second conditional random field sequentially connected;
   wherein the one or more feature maps comprise a first feature map generated from an N-th residual block of the N number of residual blocks;
   wherein analyzing the one or more feature maps comprises:
   analyzing the first feature map using the first feature analyzing branch, to generate a plurality of first predictions respectively corresponding to the plurality of subpixels of the input image; and
   analyzing the first feature map using the second feature analyzing branch, to generate a plurality of second predictions respectively corresponding to the plurality of subpixels of the input image.

3. The method of claim 2, wherein analyzing the first feature map using the first feature analyzing branch comprises:
   inputting the first feature map to the dual attention network, to generate a dual attention feature map;
   performing a deconvolution process on the dual attention feature map, to generate a deconvolutional dual attention feature map; and
   inputting the deconvolutional dual attention feature map into the first conditional random field, to generate the plurality of first predictions respectively corresponding to the plurality of subpixels of the input image.

4. The method of claim 3, wherein the first feature map is input into both the dual attention network and the pyramid pooling module;

wherein analyzing the first feature map using the second feature analyzing branch comprises:
inputting the first feature map to the pyramid pooling module, to generate a pyramid pooling feature map;
performing a deconvolution process on the pyramid pooling feature map, to generate a deconvolutional pyramid pooling feature map; and
inputting deconvolutional pyramid pooling feature map into the second conditional random field, to generate the plurality of second predictions respectively corresponding to the plurality of subpixels of the input image.

5. The method of claim 2, wherein the M number of feature analyzing branches further comprise a third feature analyzing branch, and the third feature analyzing branch comprises a third conditional random field;
wherein the one or more feature maps further comprise a second feature map generated from an (N−1)-th residual block of the N number of residual blocks;
wherein analyzing the one or more feature maps further comprises analyzing the second feature map using the third feature analyzing branch, to generate a plurality of third predictions respectively corresponding to the plurality of subpixels of the input image.

6. The method of claim 5, wherein analyzing the second feature map using the third feature analyzing branch comprises:
performing a plurality of convolution processes on the second feature map, to generate a convolutional second feature map;
performing a deconvolution process on the convolutional second feature map, to generate a deconvolutional second feature map; and
inputting the deconvolutional second feature map into the third conditional random field, to generate a plurality of third predictions respectively corresponding to the plurality of subpixels of the input image.

7. The method of claim 6, wherein the respective one of the plurality of predictions is an average value of the respective one of the plurality of first predictions, the respective one of the plurality of second predictions, and a respective one of the plurality of third predictions.

8. The method of claim 5, wherein the second feature map is input into the third feature analyzing branch, and is input into the N-th residual block of the N number of residual blocks for generating the first feature map.

9. The method of claim 1, wherein the residual network is a dilated residual network.

10. An apparatus for semantically segmenting an input image using a neural network, comprising:
a memory;
one or more processors;
wherein the memory and the one or more processors are connected with each other; and
the memory stores computer-executable instructions for controlling the one or more processors to:
extract features of the input image to generate one or more feature maps; and
analyze the one or more feature maps to generate a plurality of predictions respectively corresponding to a plurality of subpixels of the input image;
wherein controlling the one or more processors to extract features of the input image comprises controlling the one or more processors to extract features of the input image using a residual network having N number of residual blocks, N being a positive integer greater than 1;

wherein controlling the one or more processors to analyze the one or more feature maps comprises controlling the one or more processors to analyze the one or more feature maps through M number of feature analyzing branches to generate M sets of predictions;
a respective one set of the M sets of predictions comprises multiple predictions respectively corresponding to the plurality of subpixels of the input image; and
a respective one of the plurality of predictions is an average value of corresponding ones of the M sets of predictions.

11. The apparatus of claim 10, wherein the M number of feature analyzing branches comprise:
a first feature analyzing branch comprising a dual attention network and a first conditional random field sequentially connected; and
a second feature analyzing branch comprising a pyramid pooling module and a second conditional random field sequentially connected;
wherein the one or more feature maps comprise a first feature map generated from an N-th residual block of the N number of residual blocks;
wherein controlling the one or more processors to analyze the one or more feature maps comprises:
controlling the one or more processors to analyze the first feature map using the first feature analyzing branch, to generate a plurality of first predictions respectively corresponding to the plurality of subpixels of the input image; and
controlling the one or more processors to analyze the first feature map using the second feature analyzing branch, to generate a plurality of second predictions respectively corresponding to the plurality of subpixels of the input image.

12. The apparatus of claim 11, wherein controlling the one or more processors to analyze the first feature map using the first feature analyzing branch comprises:
controlling the one or more processors to input the first feature map to the dual attention network, to generate a dual attention feature map;
controlling the one or more processors to perform a deconvolution process on the dual attention feature map, to generate a deconvolutional dual attention feature map; and
controlling the one or more processors to input the deconvolutional dual attention feature map into the first conditional random field, to generate the plurality of first predictions respectively corresponding to the plurality of subpixels of the input image.

13. The apparatus of claim 12, wherein the first feature map is input into both the dual attention network and the pyramid pooling module;
wherein controlling the one or more processors to analyze the first feature map using the second feature analyzing branch comprises:
controlling the one or more processors to input the first feature map to the pyramid pooling module, to generate a pyramid pooling feature map;
controlling the one or more processors to perform a deconvolution process on the pyramid pooling feature map, to generate a deconvolutional pyramid pooling feature map; and
controlling the one or more processors to input deconvolutional pyramid pooling feature map into the second conditional random field, to generate the plurality of second predictions respectively corresponding to the plurality of subpixels of the input image.

14. The apparatus of claim 11, wherein the M number of feature analyzing branches further comprise a third feature analyzing branch, and the third feature analyzing branch comprises a third conditional random field;

wherein the one or more feature maps further comprise a second feature map generated from an (N−1)-th residual block of the N number of residual blocks;

wherein controlling the one or more processors to analyze the one or more feature maps further comprises controlling the one or more processors to analyze the second feature map using the third feature analyzing branch, to generate a plurality of third predictions respectively corresponding to the plurality of subpixels of the input image.

15. The apparatus of claim 14, wherein controlling the one or more processors to analyze the second feature map using the third feature analyzing branch comprises:

controlling the one or more processors to performing a plurality of convolution processes on the second feature map, to generate a convolutional second feature map;

controlling the one or more processors to perform a deconvolution process on the convolutional second feature map, to generate a deconvolutional second feature map; and controlling the one or more processors to input the deconvolutional second feature map into the third conditional random field, to generate a plurality of third predictions respectively corresponding to the plurality of subpixels of the input image.

16. The apparatus of claim 15, wherein the respective one of the plurality of predictions is an average value of the respective one of the plurality of first predictions, the respective one of the plurality of second predictions, and a respective one of the plurality of third predictions.

17. The apparatus of claim 14, wherein the second feature map is input into the third feature analyzing branch, and is input into the N-th residual block of the N number of residual blocks for generating the first feature map.

18. The apparatus of claim 10, wherein the residual network is a dilated residual network.

19. A method of pre-training an apparatus for semantically segmenting an input image using a neural network, comprising:

obtaining a training database having a plurality of training images, a respective one of the plurality of training images having a plurality of pre-determined predictions respectively corresponding to a plurality of subpixels of the respective one of the plurality of training images;

selecting a training image from the training database;

extracting features of the training image to generate one or more training feature maps;

analyzing the one or more training feature maps to generate a plurality of training predictions respectively corresponding to a plurality of subpixels of the training image;

computing total losses with respect to the plurality of subpixels of the training image using a loss function based on the plurality of training predictions and the plurality of pre-determined predictions; and tuning parameters of the apparatus based on the total losses;

wherein extracting features of the training image comprises extracting features of the training image using a residual network having N number of residual blocks, N being a positive integer greater than 1;

wherein analyzing the one or more training feature maps comprises analyzing the one or more training feature maps through M number of feature analyzing branches respectively, to generate M sets of training predictions;

a respective one set of the M sets of training predictions comprises multiple training predictions respectively corresponding to the plurality of subpixels of the training image; and a respective one of the plurality of training predictions is an average value of corresponding ones of the M sets of training predictions;

wherein computing the total losses with respect to the plurality of subpixels of the training image comprises computing M sets of losses;

a respective one set of the M sets of losses comprises multiple losses respectively corresponding to the plurality of subpixels of the training image;

wherein the total losses with respect to the plurality of subpixels of the training image is a weighted average of corresponding ones of the M sets of losses.

20. The method of claim 19, wherein the M number of feature analyzing branches comprise:

a first feature analyzing branch comprising a dual attention network and a first conditional random field sequentially connected; and a second feature analyzing branch comprising a pyramid pooling module and a second conditional random field sequentially connected;

wherein the one or more training feature maps comprise a first training feature map generated from an N-th residual block of the N number of residual blocks;

wherein analyzing the one or more training feature maps comprises:

analyzing the first training feature map using the first feature analyzing branch, to generate a plurality of first training predictions respectively corresponding to the plurality of subpixels of the training image; and analyzing the first training feature map using the second feature analyzing branch, to generate a plurality of second training predictions respectively corresponding to the plurality of subpixels of the input image;

wherein computing the total losses with respect to the plurality of subpixels of the training image comprises:

computing first losses respectively corresponding to the plurality of subpixels of the training image and between the plurality of first training predictions and the plurality of pre-determined predictions using a softmax cross-entropy loss function; and computing second losses respectively corresponding to the plurality of subpixels of the training image and between the plurality of second training predictions and the plurality of pre-determined predictions using the softmax cross-entry loss function.

* * * * *